US008687677B2

(12) United States Patent
Murakami et al.

(10) Patent No.: US 8,687,677 B2
(45) Date of Patent: Apr. 1, 2014

(54) METHOD FOR DIGITAL WIRELESS COMMUNICATIONS

(71) Applicant: Harris Corporation, Melbourne, FL (US)

(72) Inventors: Yutaka Murakami, Kanagawa (JP); Shinichiro Takabayashi, Kanagawa (JP); Masayuki Orihashi, Chiba (JP); Akihiko Matsuoka, Kanagawa (JP)

(73) Assignee: Harris Corporation, Melbourne, FL (US)

( * ) Notice: Subject to any disclaimer, the term of this patent is extended or adjusted under 35 U.S.C. 154(b) by 0 days.

(21) Appl. No.: 13/890,973

(22) Filed: May 9, 2013

(65) Prior Publication Data

US 2013/0251008 A1    Sep. 26, 2013

Related U.S. Application Data

(60) Continuation of application No. 13/324,389, filed on Dec. 13, 2011, now Pat. No. 8,442,158, which is a continuation of application No. 12/971,564, filed on Dec. 17, 2010, now Pat. No. 8,098,772, which is a continuation of application No. 12/724,098, filed on Mar. 15, 2010, now Pat. No. 7,873,124, which is a continuation of application No. 12/345,297, filed on Dec. 29, 2008, now Pat. No. 7,711,064, which is a continuation of application No. 11/831,383, filed on Jul. 31, 2007, now Pat. No. 7,492,833, which is a division of application No. 10/781,839, filed on Feb. 20, 2004, now Pat. No. 7,359,454, which is a continuation of application No. 10/427,992, filed on May 2, 2003, now Pat. No. 6,748,023, which is a continuation of application No. 09/482,892, filed on Jan. 14, 2000, now Pat. No. 6,608,868.

(30) Foreign Application Priority Data

Jan. 19, 1999  (JP) ..................................... 11-010146
Jul. 28, 1999  (JP) ..................................... 11-213264

(51) Int. Cl.
*H04B 1/38* (2006.01)

(52) U.S. Cl.
USPC ........................................ 375/219; 375/261

(58) Field of Classification Search
USPC ........................................ 375/219, 267, 261
See application file for complete search history.

(56) References Cited

U.S. PATENT DOCUMENTS 5,241,544 A    8/1993  Jasper et al.
5,381,449 A    1/1995  Jasper et al.
(Continued)

FOREIGN PATENT DOCUMENTS

EP    0734132    9/1996
EP    1052821    11/2000
(Continued)

OTHER PUBLICATIONS

Sampei, Technical Report of IEICE B-II, vol. J72-B-II, No. 1, Jan. 1989, pp. 7-15, no English translation available.

*Primary Examiner* — Daniel Washburn
*Assistant Examiner* — Fitwi Hailegiorgis
(74) *Attorney, Agent, or Firm* — Allen, Dyer, Doppelt, Milbrath & Gilchrist, P.A.

(57) ABSTRACT

In a multivalue modulation type with one pilot symbol inserted for every 3 or more symbols, signal points of each one symbol immediately before and after a pilot symbol are modulated using a modulation type different from that for pilot symbols. In this way, it is possible to suppress deterioration of the accuracy in estimating the reference phase and amount of frequency offset by pilot symbols and improve the bit error rate characteristic in the signal to noise ratio in quasi-coherent detection with symbols whose symbol synchronization is not completely established.

25 Claims, 28 Drawing Sheets

(56) References Cited

U.S. PATENT DOCUMENTS

| | | | |
|---|---|---|---|
| 5,414,734 A * | 5/1995 | Marchetto et al. ............ 375/267 |
| 5,499,395 A | 3/1996 | Doi et al. |
| 5,519,730 A | 5/1996 | Jasper et al. |
| 5,533,048 A | 7/1996 | Dolan |
| 5,535,245 A * | 7/1996 | Kim ............................ 375/261 |
| 5,659,728 A | 8/1997 | Bhargava et al. |
| 5,771,224 A | 6/1998 | Seki et al. |
| 5,809,009 A | 9/1998 | Matsuoka et al. |
| 5,838,728 A | 11/1998 | Alamouti et al. |
| 5,870,393 A | 2/1999 | Yano et al. |
| 5,914,959 A | 6/1999 | Marchetto et al. |
| 6,154,298 A | 11/2000 | Tamagawa |
| 6,157,679 A | 12/2000 | Johnson |
| 6,175,558 B1 | 1/2001 | Miya |
| 6,226,337 B1 | 5/2001 | Klank et al. |
| 6,252,864 B1 | 6/2001 | Hayashi |
| 6,259,728 B1 | 7/2001 | Sharma et al. |
| 6,301,237 B1 | 10/2001 | Miya |
| 6,370,131 B1 | 4/2002 | Miya |
| 6,466,563 B1 | 10/2002 | Yamada |
| 6,529,492 B1 | 3/2003 | Miya |
| 6,549,526 B2 | 4/2003 | Miya |
| 6,580,705 B1 | 6/2003 | Riazi et al. |
| 6,584,088 B2 | 6/2003 | Miya |
| 6,608,868 B1 | 8/2003 | Murakami et al. |
| 6,738,430 B2 | 5/2004 | Murakami et al. |
| 6,748,023 B2 | 6/2004 | Murakami et al. |
| 6,888,789 B1 | 5/2005 | Sakoda et al. |
| 7,359,454 B2 | 4/2008 | Murakami et al. |
| 7,492,833 B2 | 2/2009 | Murakami et al. |
| 7,508,842 B2 | 3/2009 | Baum et al. |
| 7,630,455 B2 | 12/2009 | Murakami et al. |
| 7,711,064 B2 | 5/2010 | Murakami et al. |
| 7,873,124 B2 | 1/2011 | Murakami et al. |
| 2008/0240289 A1 | 10/2008 | Murakami et al. |
| 2009/0161749 A1 | 6/2009 | Nangia et al. |

FOREIGN PATENT DOCUMENTS

| | | |
|---|---|---|
| JP | 9093302 | 4/1997 |
| WO | 9507581 | 3/1995 |

* cited by examiner

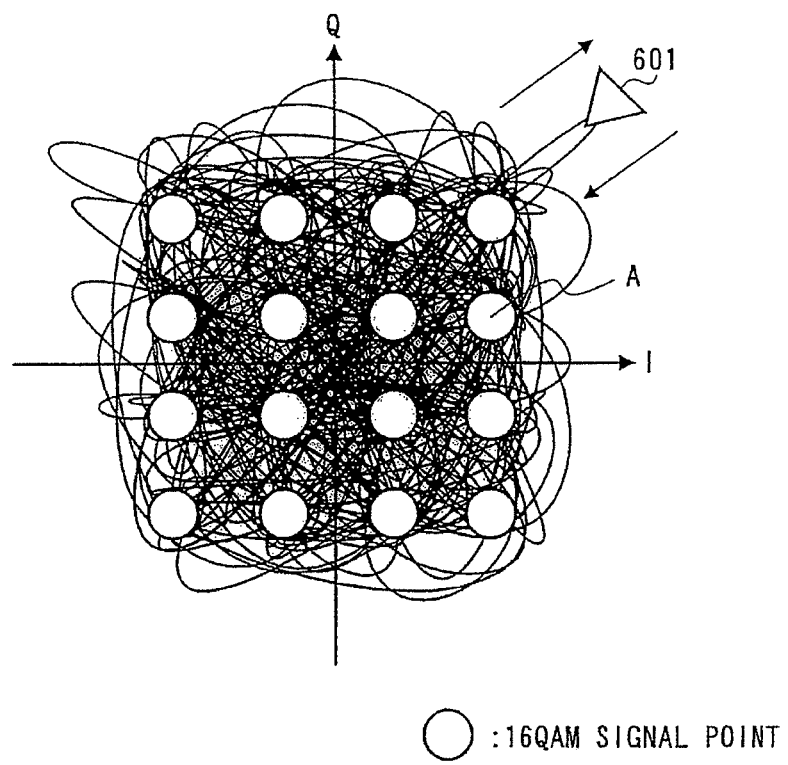
F I G. 25

METHOD FOR DIGITAL WIRELESS COMMUNICATIONS

RELATED APPLICATIONS

This application is a continuation application of co-pending U.S. application Ser. No. 13/324,389, filed Dec. 13, 2011, which is a continuation application of U.S. application Ser. No. 12/971,564 (now U.S. Pat. No. 8,098,772), filed Dec. 17, 2010, which is a continuation application of U.S. application Ser. No. 12/724,098 (now U.S. Pat. No. 7,873,124), filed Mar. 15, 2010, which is a continuation application of U.S. application Ser. No. 12/345,297 (now U.S. Pat. No. 7,711,064), filed Dec. 29, 2008, which is a continuation application of U.S. application Ser. No. 11/831,383 (now U.S. Pat. No. 7,492,833), filed Jul. 31, 2007, which is a divisional application of U.S. application Ser. No. 10/781,839 (now U.S. Pat. No. 7,359,454), filed Feb. 20, 2004, which is a continuation of U.S. application Ser. No. 10/427,992 (now U.S. Pat. No. 6,748,023), filed May 2, 2003, which is a continuation of U.S. application Ser. No. 09/482,892 (now U.S. Pat. No. 6,608,868), filed Jan. 14, 2000, the contents of which are expressly incorporated by reference herein in their entirety.

FIELD OF THE INVENTION

The present invention relates to a method for digital wireless communications using a multivalue modulation type.

DESCRIPTION OF THE RELATED ART

In a conventional digital mobile wireless communication system, a familiar example of frame configuration method to estimate a frequency offset is described in "Terrestrial Mobile Communication 16QAM Fading Distortion Compensation Method" (Sanbe, TECHNICAL REPORT OF IEICE, B-II, Vol. J-72-B-II, No. 1, pp. 7-15, January 1989). FIG. 1 shows a frame configuration according to a 16QAM system.

As shown in FIG. 1, this frame configuration has one pilot symbol inserted for every N−1 information symbols. With such a frame configuration, quasi-coherent detection is performed by estimating the reference phase, amount of frequency offset and amount of amplitude distortion using pilot symbols.

However, during quasi-coherent detection with such a frame configuration with one pilot symbol inserted for every few information symbols, symbol synchronization gets the jitters. Therefore, in quasi-coherent detection with symbols whose symbol synchronization is not completely established, the accuracy in estimating the reference phase, amount of frequency offset and amount of amplitude distortion using pilot symbols deteriorates. This results in deterioration of a bit error rate characteristic in the signal to noise ratio.

This is explained more specifically using FIG. 2A and FIG. 2B. FIG. 2A and FIG. 2B are diagrams to explain the relationship between the time and amplitude of a reception signal. In FIG. 2, reference code 1 indicates the time when pilot symbol 3 is detected with an ideal judgment time and reference code 2 indicates the time when pilot symbol 3 is detected with a time offset (jitter) generated. Reference code 4 indicates the information symbols immediately before and after pilot symbol 3.

Both a transmitter and receiver are provided with their respective clock generation functions. Because of this, the receiver has different clock generation sources, and therefore the receiver may detect waves at timing such as time 2, at which a time offset from ideal judgment time 1 has occurred. At this time, as shown in FIG. 2A and FIG. 2B, the time offset originates errors (amplitude errors) $X_I$ and $X_Q$ from the signal point. This deteriorates the error rate. Furthermore, the receiver estimates the phase, amplitude variation and frequency offset on the I-Q plane from the pilot symbol. However, when detected at time 2 when the time offset occurred, the pilot symbol signal has an error from the pilot symbol signal point, and therefore the accuracy in estimating the phase, amplitude variation and frequency offset deteriorates.

SUMMARY OF THE INVENTION

It is an objective of the present invention to provide an apparatus and method for digital wireless communications capable of improving the accuracy in estimating the reference phase and amount of frequency offset when the receiver (demodulation side) carries out quasi-coherent detection and improving the bit error rate characteristic in the signal to noise ratio.

This objective is achieved by a digital wireless communication apparatus that uses a modulation type including QPSK modulation and modulates the signal points of each one symbol immediately before and after a pilot symbol using a modulation type different from the modulation type for the pilot symbol in a frame configuration with one pilot symbol inserted for every 3 or more symbols.

This makes it possible to suppress deterioration of the accuracy in estimating the reference phase and amount of frequency offset using pilot symbols in quasi-coherent detection with symbols whose symbol synchronization is not completely established and improve the bit error rate characteristic in the signal to noise ratio.

Furthermore, this objective is also achieved by a digital wireless communication apparatus that increases the amplitude at pilot symbol signal points more than the maximum amplitude at signal points according to the multivalue modulation type with 8 or more values.

This apparatus can not only suppress deterioration in the accuracy in estimating the reference phase, amount of frequency offset by a pilot symbol in quasi-coherent detection with symbols whose symbol synchronization is not completely established, but also improve the bit error rate characteristic in the signal to noise ratio without deteriorating the power efficiency of the power amplifier on the transmitting side.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which;

FIG. 25 is a diagram showing a signal space diagram according to a 16QAM system in the digital wireless communication apparatus of the present invention.

DETAILED DESCRIPTION OF THE PREFERRED EMBODIMENTS

Figure 1:
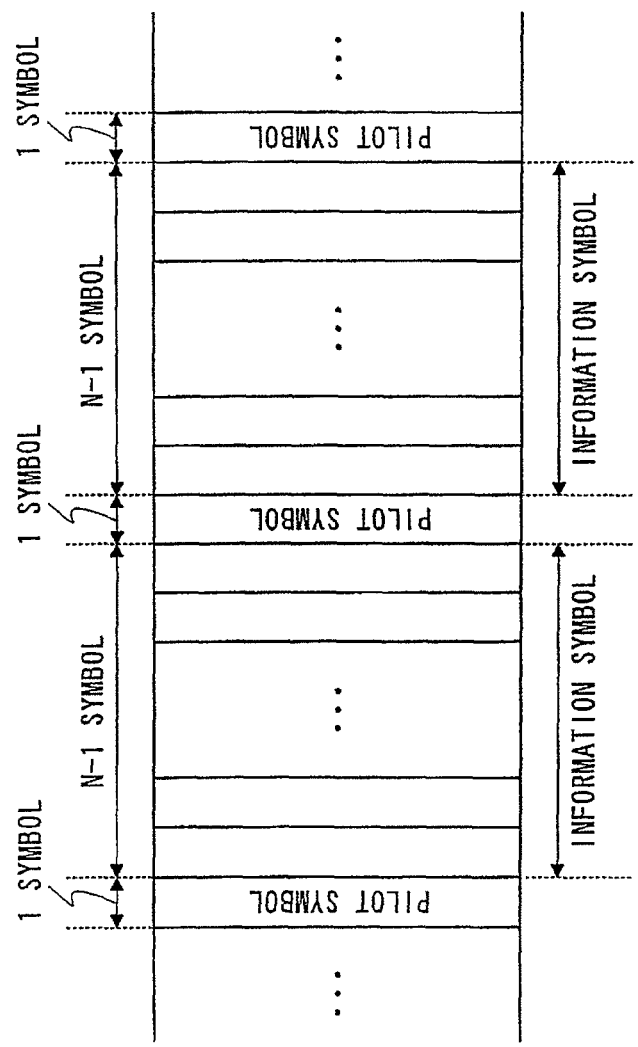
FIG. 1 is a diagram showing a frame configuration example of a conventional digital wireless communication apparatus.
Figure 2A:
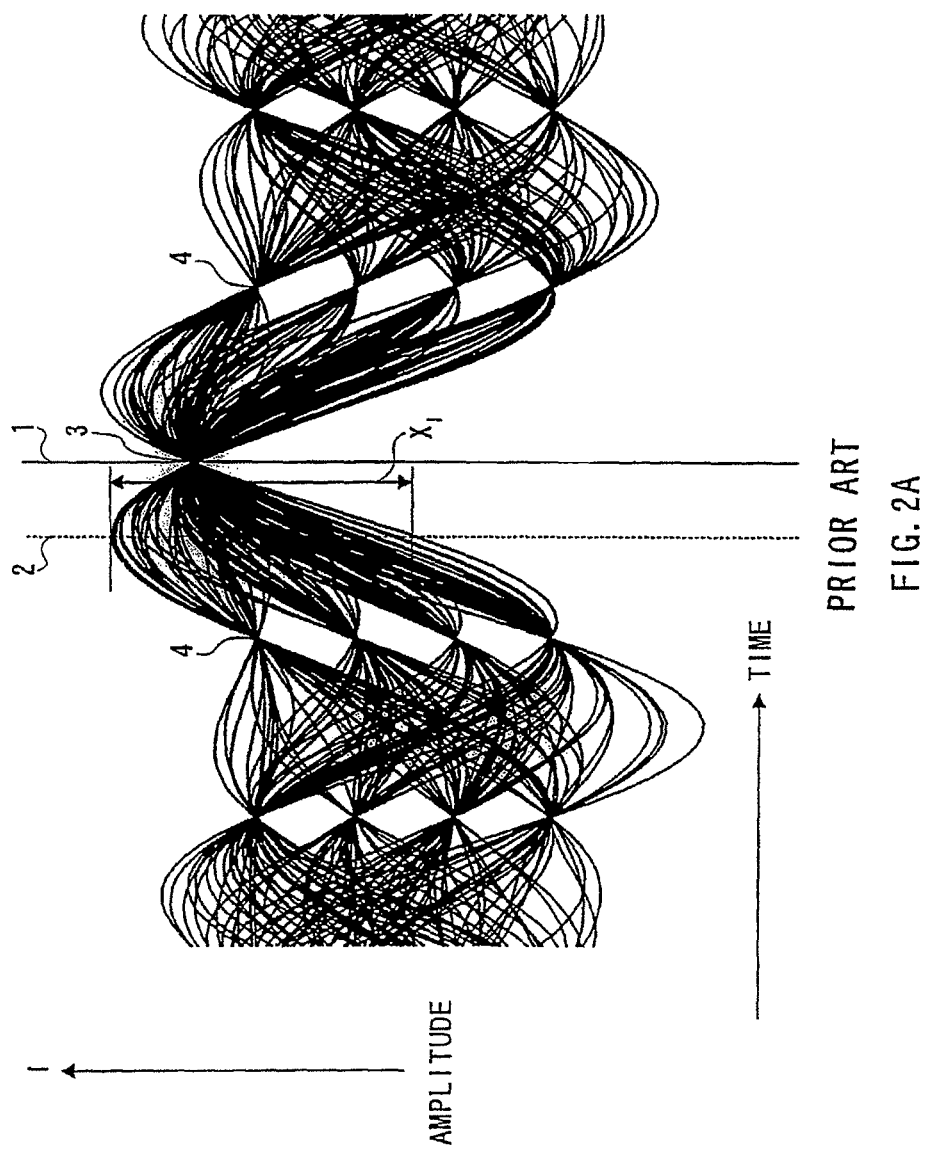
FIG. 2A is a diagram showing a relationship between the amplitude and time when a reception signal (I component) is received.
Figure 2B:
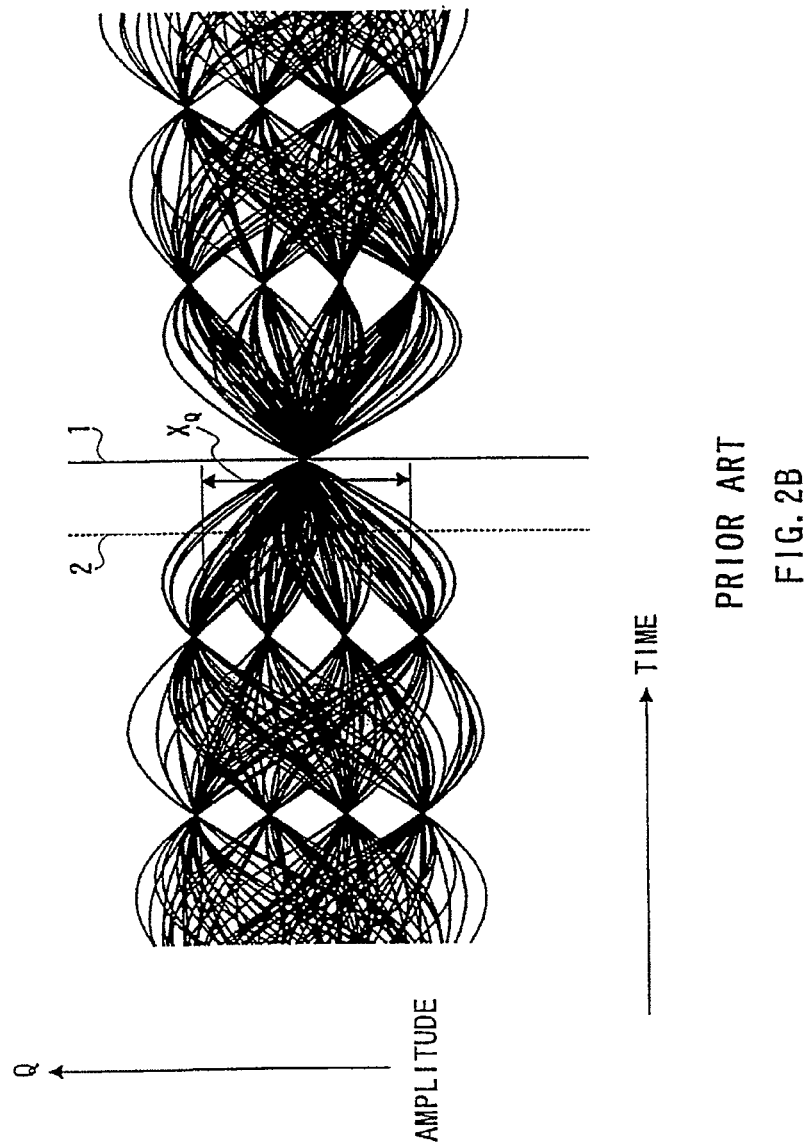
FIG. 2B is a diagram showing a relationship between the amplitude and time when a reception signal (Q component) is received.

As shown in FIG. 2A and FIG. 2B, if a reception signal is detected at time 2 at which a time offset is generated, an error from signal point 3 of a pilot symbol occurs, and therefore amplitude errors $X_I$ and $X_Q$ may occur. Because of this, the accuracy in estimating the phase, amplitude variation and frequency offset on the I-Q plane deteriorates.

Figure 3:
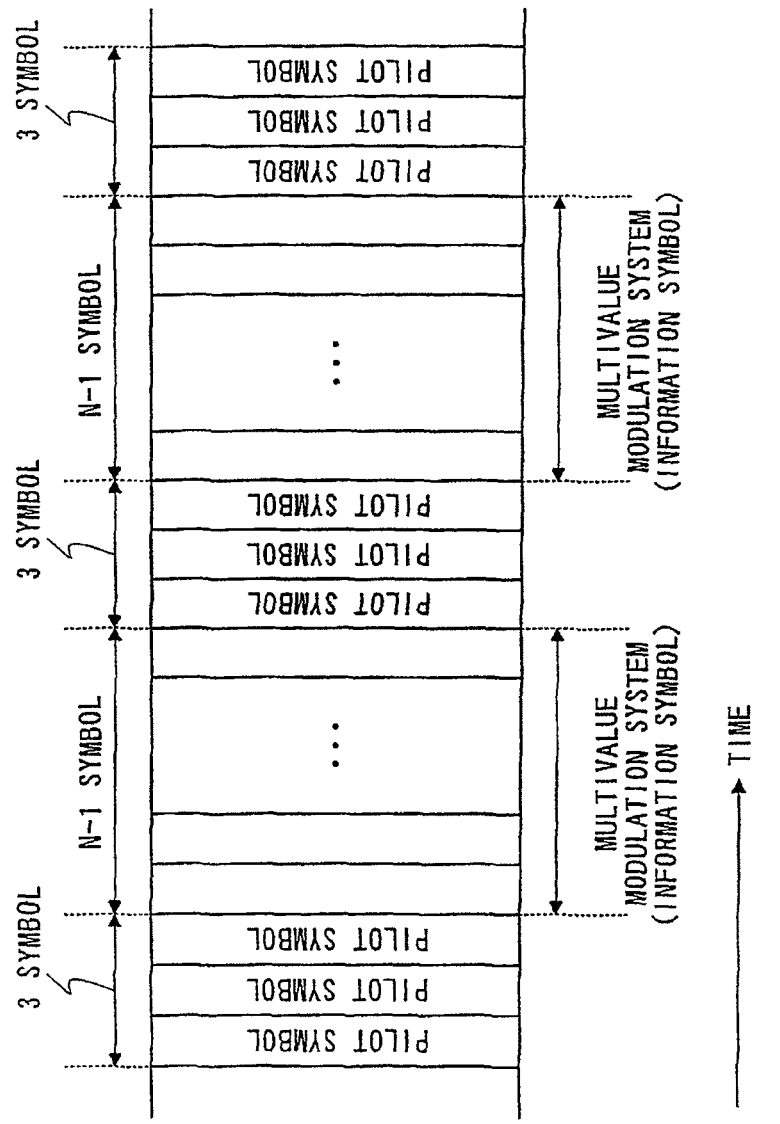
FIG. 3 is a diagram showing another frame configuration example of the conventional digital wireless communication apparatus.

At this time, the simplest pilot symbol configuration is to have 3 consecutive pilot symbols as shown in FIG. 3. In such a configuration, even if a time offset occurs, the error from a pilot symbol signal point reduces because there are 3 consecutive pilot symbols.

However, since no pilot symbols are transmitted immediately before and after the pilot symbol to transmit information, this results in a problem in terms of the transmission efficiency. Thus, the present invention suppresses deterioration of the information transmission efficiency and suppresses errors from pilot symbol signal points when a time offset occurs by modulating symbols immediately before and after a pilot symbol according to a modulation type different from the pilot symbol modulation type. Thus, the present invention can suppress deterioration of the error rate by suppressing deterioration of the accuracy in estimating the phase, amplitude variation and frequency offset on the I-Q plane.

As the multivalue modulation type, the present specification includes a 64QAM system, 32QAM system, 16QAM system, 8PSK modulation type, QPSK modulation type, 16APSK modulation type and π/4-shift DQPSK modulation type.

With reference now to the attached drawings, the embodiments of the present invention are explained in detail below.
(Embodiment 1)

Figure 4:
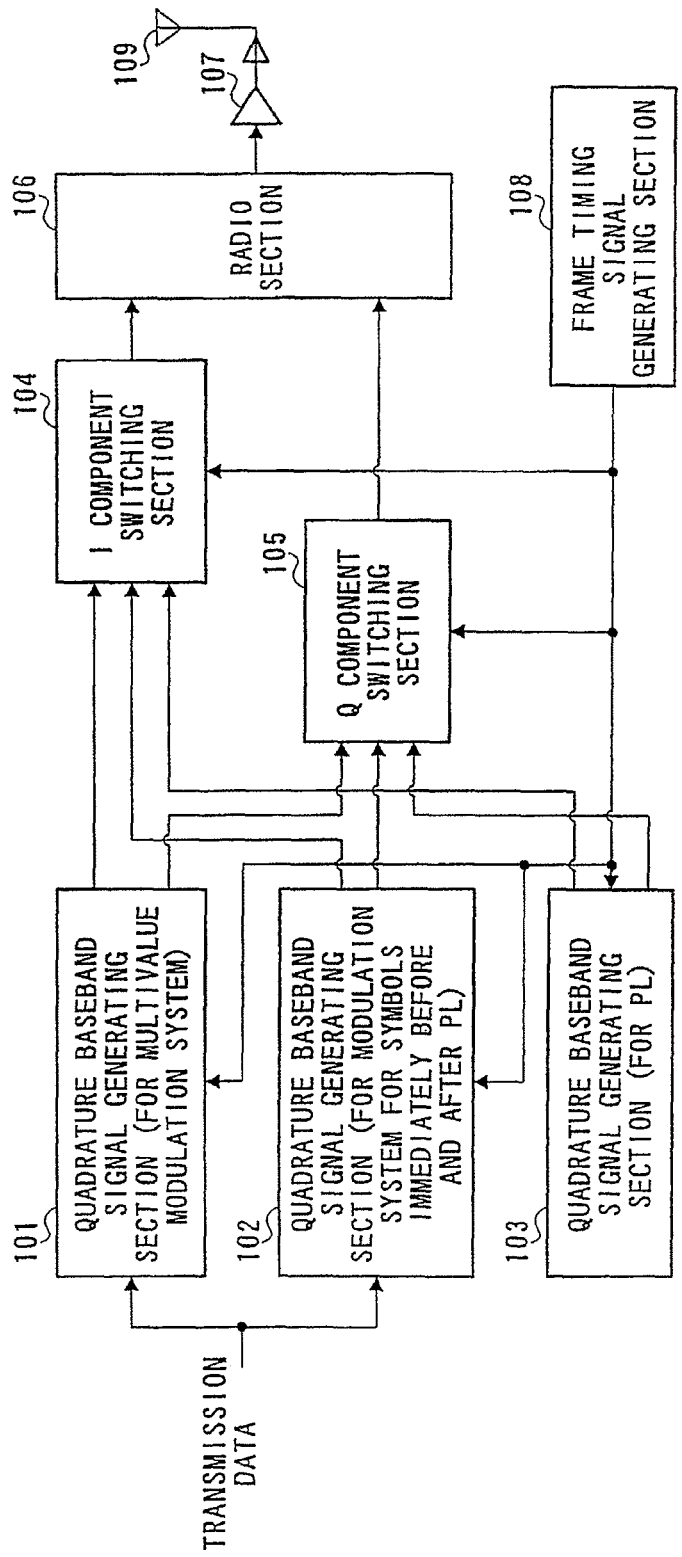
FIG. 4 is a diagram showing a configuration of the transmitter side of a digital wireless communication apparatus of the present invention.
Figure 5:
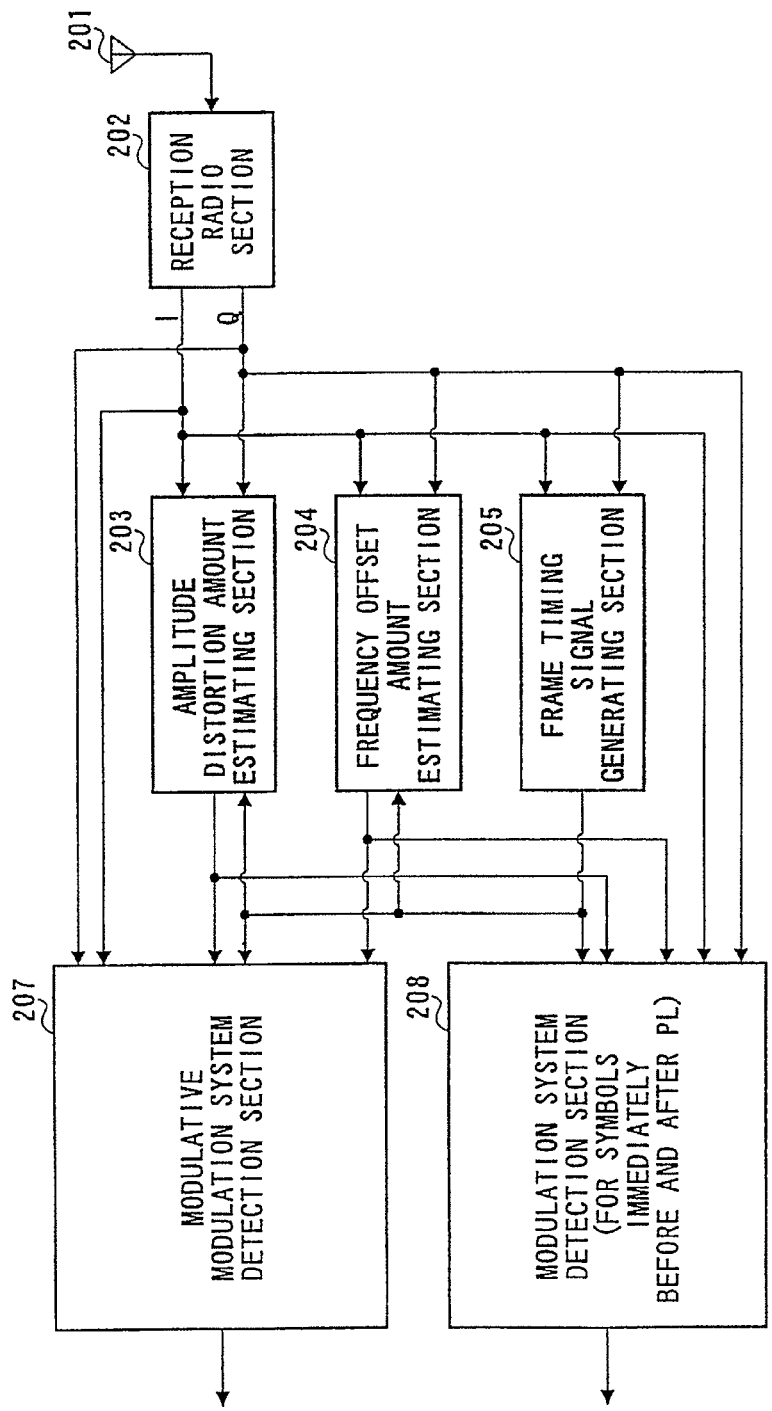
FIG. 5 is a diagram showing a configuration of the receiver side of the digital wireless communication apparatus of the present invention.
Figure 6A:
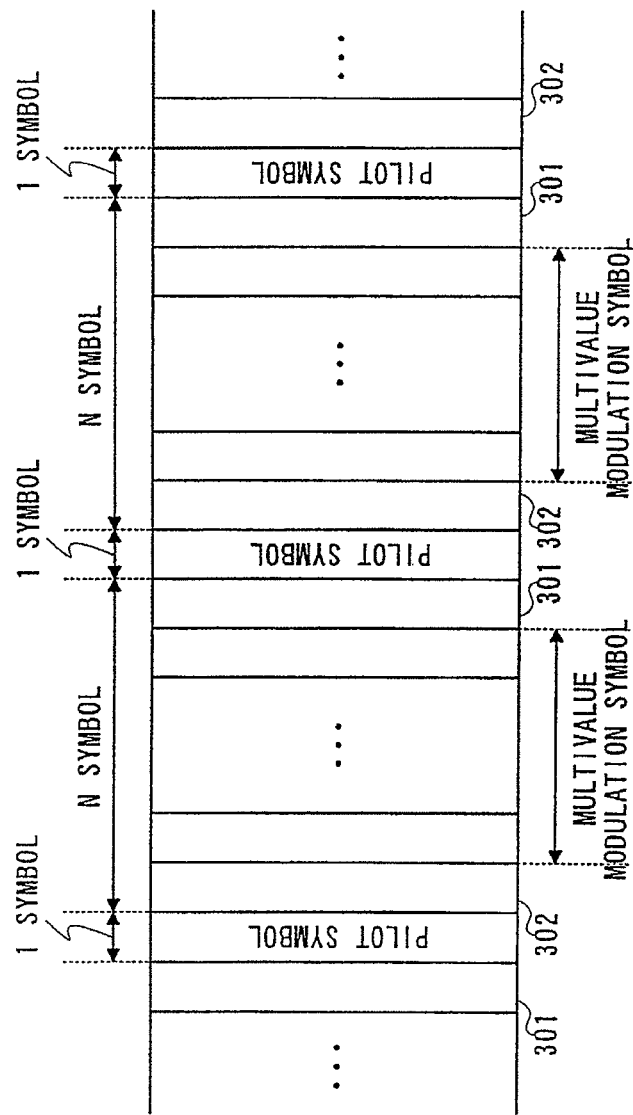
FIG. 6A is a diagram showing a frame configuration example of a digital wireless communication apparatus of the present invention.

FIG. 4 is a block diagram showing a configuration of the transmitter side of a digital wireless communication apparatus of the present invention. FIG. 5 is a block diagram showing a configuration of the receiver side of a digital wireless communication apparatus of the present invention. FIG. 6A is a diagram showing a frame configuration used in the digital wireless communication apparatus of the present invention.

The following is an explanation of a case where the modulation type used is a multivalue modulation type.

On the transmitter side shown in FIG. 4, transmission data are sent to quadrature baseband signal generating section (for multivalue modulation type) 101 and quadrature baseband signal generating section (for modulation type for symbols immediately before and after PL) 102. Frame timing signal generating section 108 generates a frame timing signal at timing indicating a frame configuration shown in FIG. 6A and outputs the frame timing signal to quadrature baseband signal generating section (for multivalue modulation type) 101, quadrature baseband signal generating section (for modulation type for symbols immediately before and after PL) 102 and quadrature baseband signal generating section (for PL) 103.

Quadrature baseband signal generating section (for multivalue modulation type) 101 receives transmission data and a frame timing signal as inputs and if the frame timing signal indicates a multivalue modulation symbol, quadrature baseband signal generating section (for multivalue modulation type) 101 outputs the I component of the quadrature baseband signal for the multivalue modulation type to I component switching section 104 and outputs the Q component of the quadrature baseband signal for the multivalue modulation type to Q component switching section 105.

Quadrature baseband signal generating section (for modulation type for symbols immediately before and after PL) 102 receives transmission data and a frame timing signal as inputs and if the frame timing signal indicates a symbol immediately before or after the pilot symbol, quadrature baseband signal generating section (for modulation type for symbols immediately before and after PL) 102 outputs the I component of the quadrature baseband signal for the modulation type for symbols immediately before and after PL to I component switching section 104 and outputs the Q component of the quadrature baseband signal for the modulation type for symbols immediately before and after PL to Q component switching section 105.

Quadrature baseband signal generating section (for PL) 103 receives a frame timing signal as an input and if the frame timing signal indicates a pilot symbol, quadrature baseband signal generating section (for PL) 103 outputs the I component of the pilot symbol quadrature baseband signal to I component switching section 104 and outputs the Q component of the pilot symbol quadrature baseband signal to Q component switching section 105.

I component switching section 104 receives the I component of the quadrature baseband signal for the multivalue modulation type, the I component of quadrature baseband signal for symbols immediately before and after PL and the I component of the PL quadrature baseband signal and a frame timing signal as inputs, and switches between the I component of the quadrature baseband signal for the multivalue modulation type, the I component of quadrature baseband signal for symbols immediately before and after PL and the I component of pilot symbol quadrature baseband signal according to the frame timing signal and outputs them to a section for radio frequency (radio section) 106 as the I component of the transmission quadrate baseband signal.

Q component switching section 105 receives the Q component of the quadrature baseband signal for the multivalue modulation type, the Q component of quadrature baseband signal for symbols immediately before and after PL and the Q component of the PL quadrature baseband signal and a frame timing signal as inputs, and switches between the Q component of the quadrature baseband signal for the multivalue modulation type, the Q component of quadrature baseband signal for symbols immediately before and after PL and the Q component of pilot symbol quadrature baseband signal according to the frame timing signal and outputs them to radio section 106 as the Q component of the transmission quadrate baseband signal.

Radio section 106 receives the I component and Q component of the transmission quadrature baseband signal as inputs, carries out predetermined radio processing on the baseband signal and then outputs a transmission signal. This transmission signal is amplified by power amplifier 107 and the amplified transmission signal is output from transmission antenna 109.

On the receiver side shown in FIG. 5, radio section 202 receives the signal received from antenna 201 as an input, quadrature-modulates the input signal and outputs the I component and Q component of the reception quadrature baseband signal.

Frame timing signal generating section 205 receives the I component and Q component of the reception quadrature baseband signal as inputs, detects a frame configuration shown in FIG. 6A and outputs a frame timing signal to multivalue modulation type detection section 207, frequency offset amount estimating section 204 and modulation type detection section (for symbols immediately before and after PL) 208.

Amplitude distortion amount estimating section 203 receives the I component and Q component of the reception quadrature baseband signal and frame timing signal as inputs, extracts a pilot symbol, estimates the amount of amplitude distortion from the I component and Q component of the pilot symbol quadrature baseband signal and outputs the amplitude distortion amount estimation signal to multivalue modulation type detection section 207 and modulation type detection section (for symbols immediately before and after PL) 208.

Frequency offset amount estimating section 204 receives the I component and Q component of the reception quadrature baseband signal and frame timing signal as inputs, extracts a pilot symbol, estimates the amount of frequency offset from the I component and Q component of the pilot symbol quadrature baseband signal and outputs the frequency offset amount estimating signal to multivalue modulation type detection section 207 and modulation type detection section (for symbols immediately before and after PL) 208.

Multivalue modulation type detection section 207 receives the I component and Q component of the reception quadrature baseband signal, frame timing signal, amplitude distortion amount estimating signal and frequency offset estimating signal as inputs, carries out detection when the input is a multivalue modulation type symbol and outputs a reception digital signal according to the multivalue modulation type.

Modulation type detection section (for symbols immediately before and after PL) 208 receives the I component and Q component of the reception quadrature baseband signal, frame timing signal, amplitude distortion amount estimating signal and frequency offset estimating signal as inputs, carries out detection when the inputs are symbols immediately before and after a pilot symbol and outputs a reception digital signal according to the modulation type of the symbols immediately before and after the pilot symbol.

In the digital wireless communication apparatus in the configuration above, a signal in a frame configuration as shown in FIG. 6A is transmitted/received. That is, the modulation type that modulates pilot symbols is different from the modulation type that modulates symbol 301 immediately before the pilot symbol and symbol 302 immediately after the pilot symbol. It is especially desirable that the number of multivalues in the modulation type for modulating symbols immediately before and after the pilot symbol be smaller than the number of multivalues in the modulation type for modulating pilot symbols.

Figure 6B:
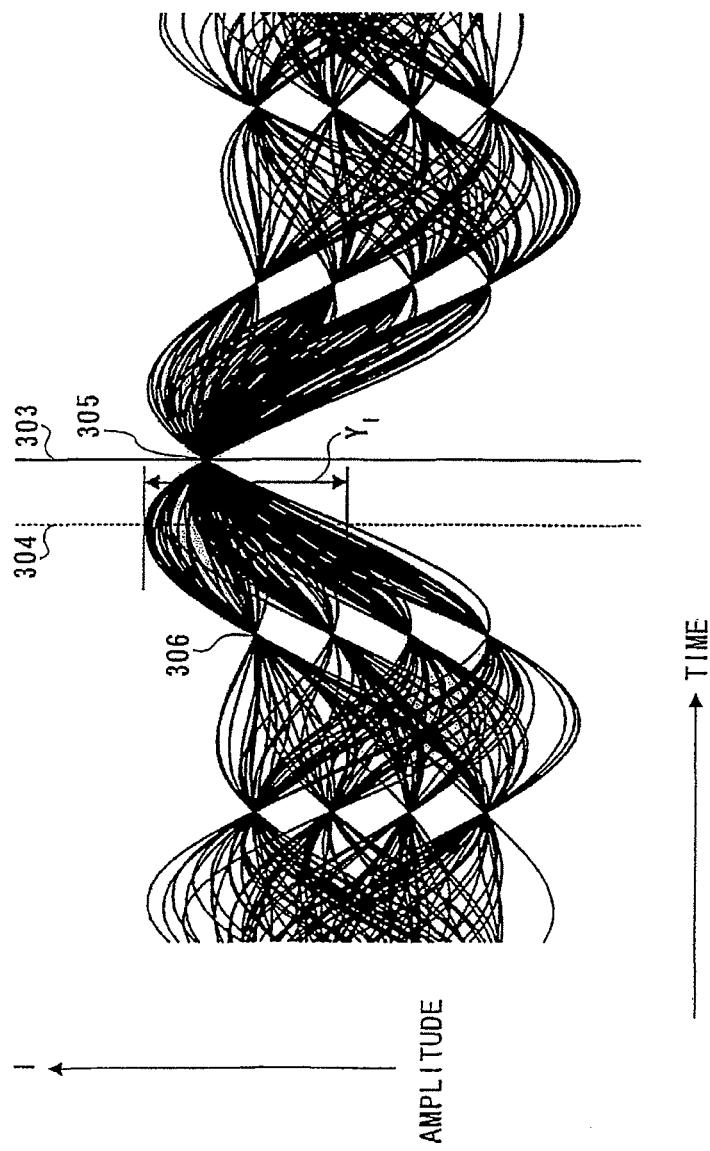
FIG. 6B is a diagram showing a relationship between the amplitude and time when a reception signal (I component) is received.
Figure 6C:
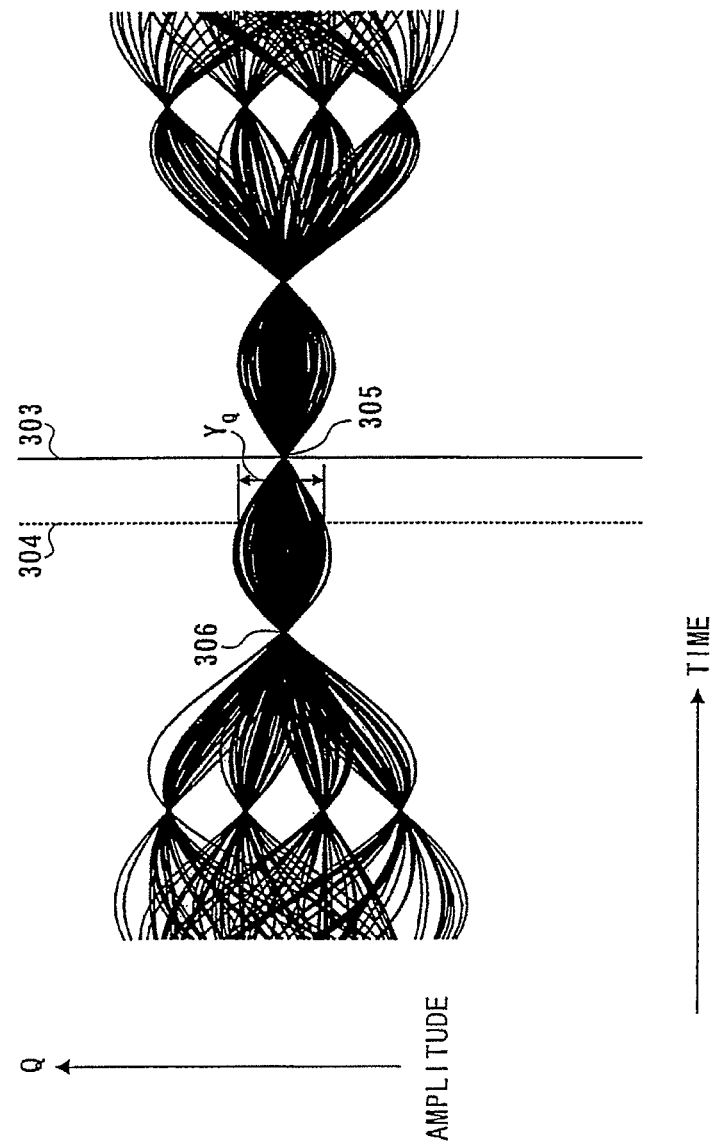
FIG. 6C is a diagram showing a relationship between the amplitude and time when a reception signal (Q component) is received.

For example, as shown in FIG. 6B and FIG. 6C, if the modulation type of pilot symbol 305 is QPSK modulation and the modulation type of symbol 306 immediately before and after the pilot symbol is 16QAM, when a time offset (jitter) from ideal judgment time 303 occurs (time 304), errors (amplitude errors) $Y_I$ and $Y_Q$ from the signal point occur because of the time offset. These errors (amplitude errors) $Y_I$ and $Y_Q$ are much smaller than amplitude errors $X_I$ and $X_Q$ shown in FIG. 2A and FIG. 2B.

Thus, because the modulation type for modulating pilot symbols is different from the modulation type for modulating symbols immediately before and after a pilot symbol, it is possible to suppress errors from pilot symbol signal points when a time offset occurs while suppressing deterioration of the information transmission efficiency. As a result, it is possible to suppress deterioration of the accuracy in estimating the phase, amplitude variation and frequency offset on the I-Q plane and suppress deterioration of the error rate.

In the present invention, the method for differentiating the modulation type for modulating pilot symbols from the modulation type for modulating symbols immediately before and after a pilot symbol includes, for example, a method of placing two or more signal points of each one symbol immediately before and after a pilot symbol on a virtual line connecting the pilot symbol signal point and the origin on the in-phase I-quadrature Q plane. In this case, it is desirable to use a modulation type with fewer multivalues than the pilot symbol modulation type with 8 or more values for symbols immediately before and after the pilot symbol.

The digital wireless communication apparatus of the present invention has both the configuration on the transmitter side shown in FIG. 4 and the configuration on the receiver side shown in FIG. 5. The configurations in FIG. 4 and FIG. 5 are only examples and the present invention is not limited to these examples only.

(Embodiment 2)

Figure 7:
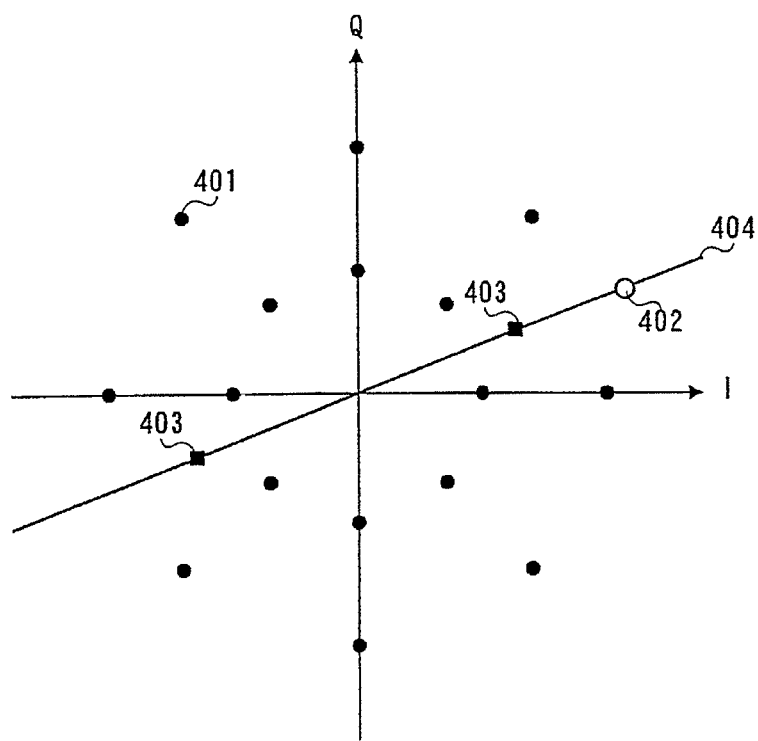
FIG. 7 is a diagram showing a signal space diagram example according to a 16APSK modulation type in the digital wireless-communication apparatus of the present invention.

FIG. 7 shows a signal space diagram on the in-phase I-quadrature Q plane according to a 16APSK modulation type, which is an example of a multivalue modulation type with 8 or more values, indicating pilot symbol signal points and signal points of one symbol before and after the pilot symbols. In FIG. 7, reference codes 401 indicate signal points according to the 16APSK modulation type, reference code 402 indicates the pilot symbol signal point and reference codes 403 indicate the signal points of each one symbol immediately before and after the pilot symbol. Furthermore, reference code 404 is a virtual line connecting the pilot symbol signal point and the origin on the I-Q plane, and two or more signal points 403 of each one symbol immediately before and after the pilot symbol are placed on virtual line 404 connecting the pilot symbol signal point 402 and the origin.

Figure 8:
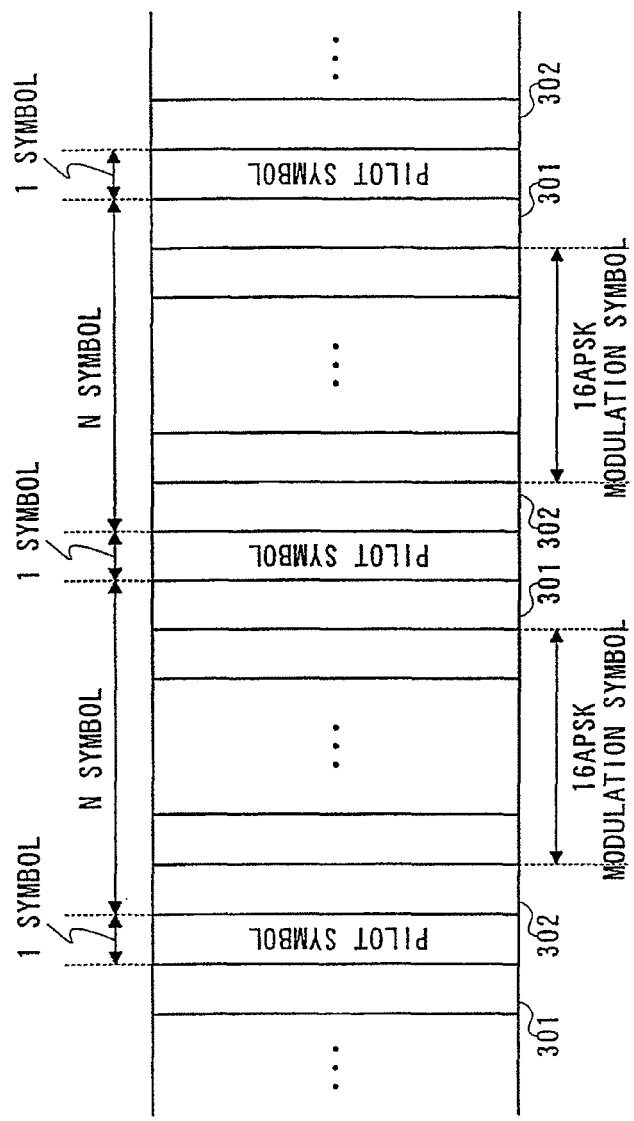
FIG. 8 is a diagram showing a frame configuration example according to the 16APSK modulation type in the digital wireless communication apparatus of the present invention.

FIG. 8 shows a frame configuration example of symbols and pilot symbols modulated according to the 16APSK modulation type. Reference code 301 indicates one symbol immediately before a pilot symbol and reference code 302 indicates one symbol immediately after the pilot symbol. At this time, 2 or more signal points of one symbol 301 immediately before the pilot symbol and one symbol 302 immediately after the pilot symbol are placed on virtual line 404 connecting pilot symbol signal point 402 and the origin on the in-phase I-quadrature Q plane.

If the transmission data is a digital signal modulated according to the modulation type shown in FIG. 7 and FIG. 8, even if symbol synchronization is not completely established, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the carrier to noise ratio during detection of a reception signal.

By the way, the locations of the pilot symbol signal point and signal points of each one symbol immediately before and after the pilot symbol on the in-phase I-quadrature Q plane are not limited to FIG. 7. The frame configuration is not limited to FIG. 8, either. The present embodiment explains the case where the multivalue modulation type with 8 or more values is a 16APSK modulation type, but the multivalue modulation type with 8 or more values is not limited to this.

As shown above, the digital wireless communication apparatus according to Embodiment 2 places signal points of each one symbol immediately before and after the pilot symbol on a virtual line connecting the origin and pilot symbol signal point on the in-phase-quadrature plane, in a frame configuration in which one pilot symbol is inserted for every 3 symbols according to the modulation type including a multivalue modulation type with 8 or more values, and in this way can suppress deterioration of the accuracy in estimating the reference phase and the amount of frequency offset by the pilot symbol in quasi-coherent detection of symbols whose symbol synchronization is not completely established, improving the bit error rate characteristic in the signal to noise ratio.

(Embodiment 3)

Figure 9:
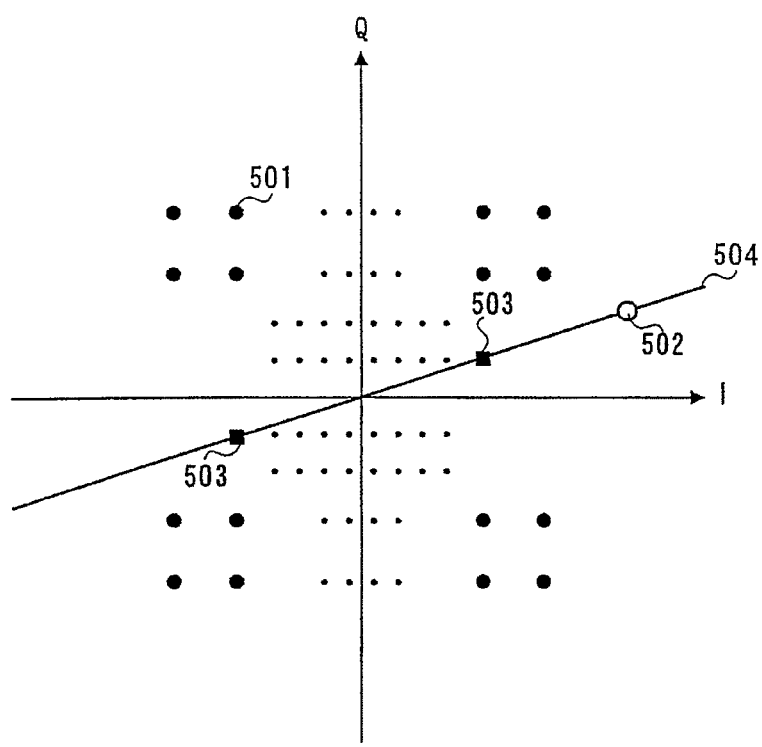
FIG. 9 is a diagram showing a signal space diagram example according to a multivalue QAM system with 8 or more values in the digital wireless communication apparatus of the present invention.

FIG. 9 shows a signal space diagram according to a multivalue quadrature amplitude modulation (QAM) system with 8 or more values on the in-phase I-quadrature Q plane and shows pilot symbol signal point and signal points of each one symbol immediately before and after the pilot symbol. In FIG. 9, reference codes 501 indicate the signal points according to the multivalue QAM system, reference code 502 indicates a pilot symbol signal point and reference codes 503 indicate signal points of each one symbol immediately before and after the pilot symbol. Reference code 504 is a virtual line connecting the pilot symbol signal point and the origin on the I-Q plane. Two or more signal points 503 of each one symbol immediately before and after the pilot symbol are placed on virtual line 504 connecting pilot symbol signal point 502 and the origin.

Figure 10:
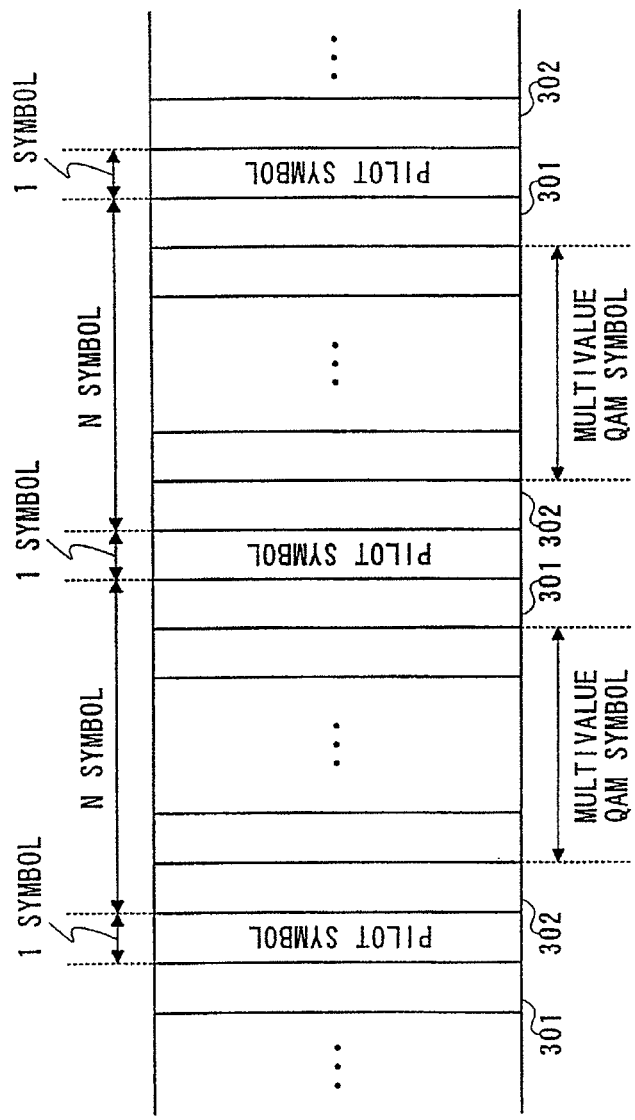
FIG. 10 is a diagram showing a frame configuration example according to the multivalue QAM system with 8 or more values in the digital wireless communication apparatus of the present invention.

FIG. 10 shows a frame configuration example of symbols and pilot symbols modulated according to the multivalue QAM system with 8 or more values. Reference code 301 indicates one symbol immediately before the pilot symbol and reference code 302 indicates one symbol immediately after the pilot symbol. At this time, two or more symbols 301 immediately before the pilot symbol and symbols 302 immediately after the pilot symbol are placed on virtual line 504 connecting pilot symbol signal point 502 and the origin on the in-phase I-quadrature Q plane.

When the digital signal modulated according to such a modulation type is detected, even if symbol synchronization is not completely established as in the case of the embodiment above, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

The locations of pilot symbol signal point and signal points of each one symbol immediately before and after the pilot symbol are not limited to FIG. 9. Moreover, the frame configuration is not limited to FIG. 10.

As shown above, the digital wireless communication apparatus according to Embodiment 3 places two or more signal points of each one symbol immediately before and after the pilot symbol on a virtual line connecting the origin and pilot symbol signal point on the in-phase-quadrature plane, in a frame configuration in which one pilot symbol is inserted for every 3 or more symbols according to the modulation type including the multivalue QAM systems with 8 or more values, and in this way can suppress deterioration of the accuracy in estimating the reference phase and the amount of frequency offset by the pilot symbol in quasi-coherent detection of symbols whose symbol synchronization is not completely established, improving the bit error rate characteristic in the signal to noise ratio.

(Embodiment 4)

Figure 11:
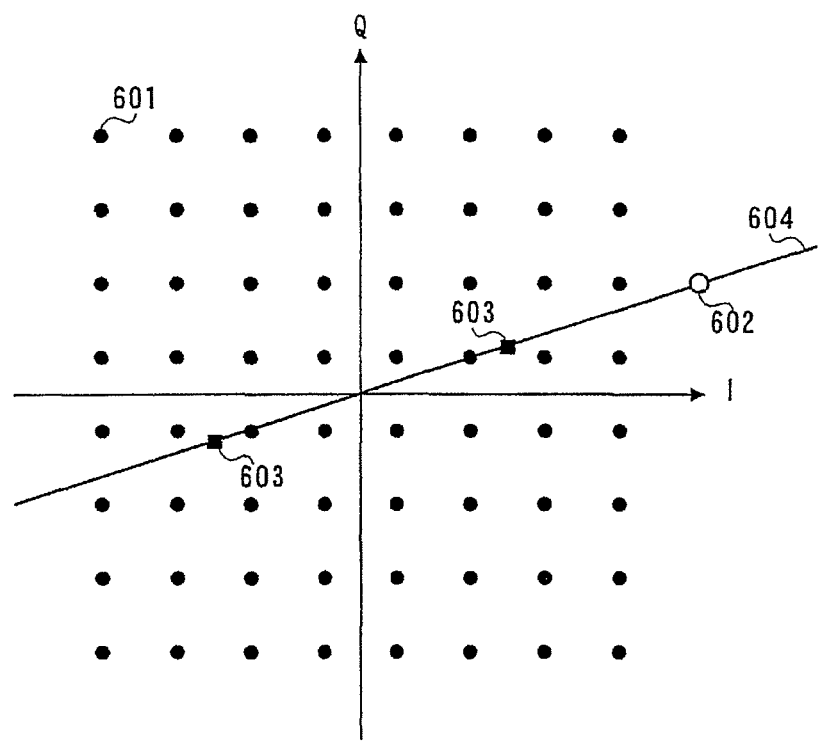
FIG. 11 is a diagram showing a signal space diagram example according to a 64QAM system in the digital wireless communication apparatus of the present invention.

FIG. 11 shows a signal space diagram according to a 16QAM system on the in-phase I-quadrature Q plane and shows a pilot symbol signal point and signal points of each one symbol immediately before and after the pilot symbol. In FIG. 11, reference codes 601 indicate signal points according to the 16QAM system, reference code 602 indicates the pilot symbol signal point and reference codes 603 indicate signal points of each one symbol immediately before and after the pilot symbol. Reference code 604 is a virtual line connecting the pilot symbol signal point and the origin on the I-Q plane. Two or more signal points 603 of each one symbol immediately before and after the pilot symbol are placed on virtual line 604 connecting pilot symbol signal point 602 and the origin.

Figure 12:
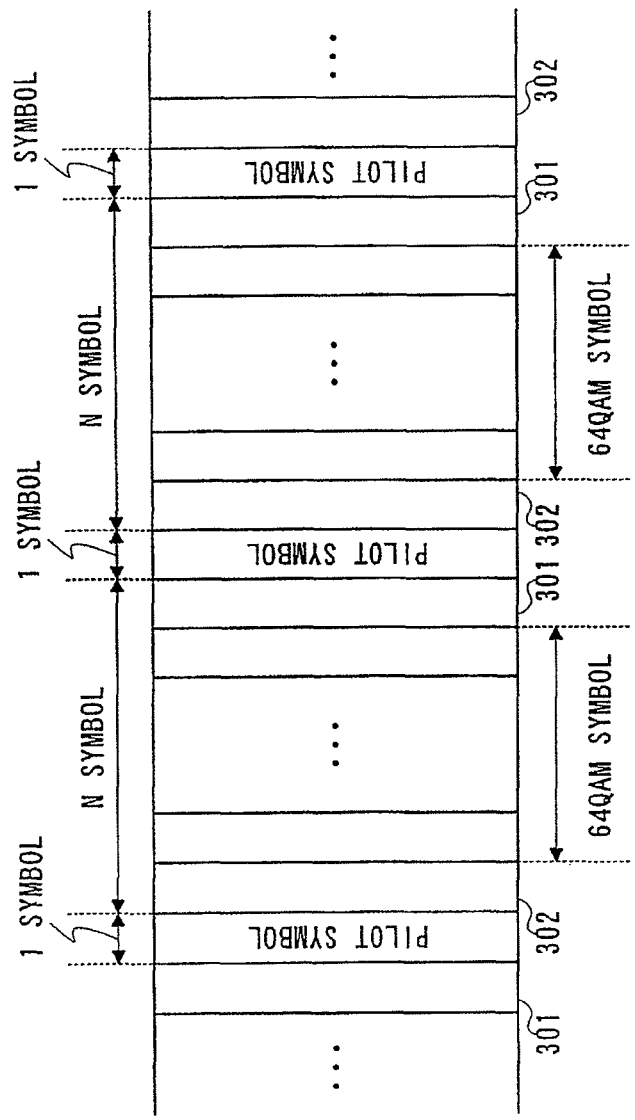
FIG. 12 is a diagram showing a frame configuration example according to the 64QAM system in the digital wireless communication apparatus of the present invention.

FIG. 12 shows a frame configuration example of symbols modulated according to the 64QAM system and pilot symbols. Reference code 301 indicates one symbol immediately before the pilot symbol and reference code 302 indicates one symbol immediately after the pilot symbol. At this time, two or more signal points 603 of one symbol 301 immediately before the pilot symbol and one symbol 302 immediately after the pilot symbol are placed on virtual line 604 connecting signal point 602 of the pilot symbol and the origin on the in-phase I-quadrature Q plane.

When the digital signal modulated according to such a modulation type is detected, even if symbol synchronization is not completely established as in the case of the embodiment above, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

The locations of the pilot symbol signal point and signal points of each one symbol immediately before and after the pilot symbol on the in-phase I-quadrature Q plane are not limited to FIG. 11. Moreover, the frame configuration is not limited to FIG. 12.

Figure 13:
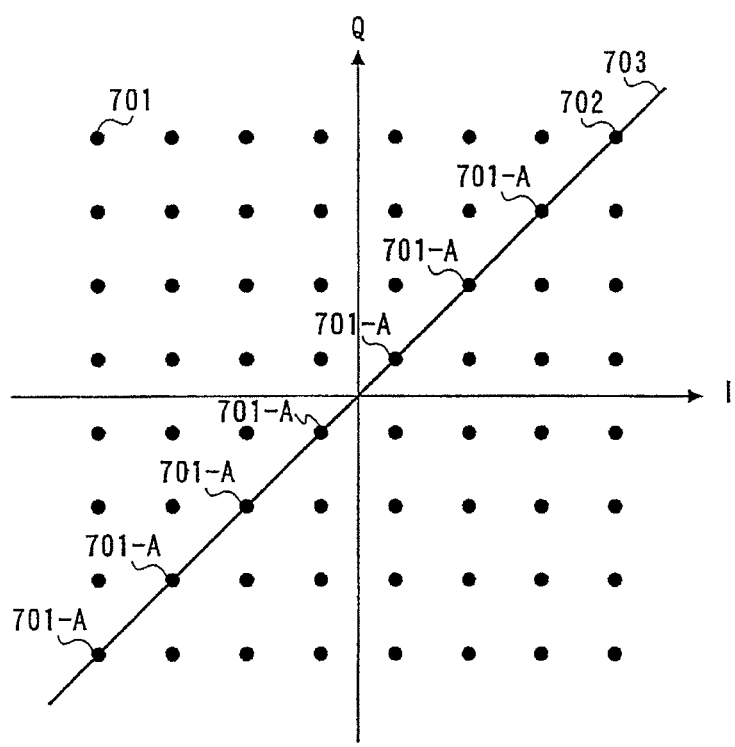
FIG. 13 is a diagram showing another signal space diagram example according to the 64QAM system in the digital wireless communication apparatus of the present invention.

FIG. 13 shows another signal space diagram example according to the 64QAM system on the in-phase I-quadrature Q plane and shows a pilot symbol signal point and signal points of each one symbol immediately before and after the pilot symbol. In FIG. 13, reference codes 701 and 701-A indicate signal points according to the 64QAM system, reference codes 701-A indicate signal points of each one symbol immediately before and after the pilot symbol, reference code 702 indicates a pilot symbol signal point and reference code 703 indicates a virtual line connecting the pilot symbol signal point and the origin on the I-Q plane.

If the signal point with the maximum signal point power of the 64QAM-based signal points is designated as pilot symbol signal point 702 and signal points 701-A on virtual line 703 connecting this and the origin are designated as the signal points of symbol 301 immediately before the pilot symbol and the signal point of one symbol 302 immediately after the pilot symbol, the pilot symbol transitions on the virtual line connecting the pilot symbol and the origin on the in-phase I-quadrature Q plane even if symbol synchronization is not completely established, and therefore it is possible to suppress deterioration of the accuracy in estimating the reference phase and the amount of frequency offset by the pilot symbol. This makes it possible to improve the bit error rate characteristic in the signal to noise ratio during detection of the reception signal. Moreover, this case has an advantage that it is possible to judge one symbol 301 immediately before the pilot symbol and one symbol 302 immediately after the pilot symbol using a 64QAM-based judgment method.

In FIG. 13, reference code 702 is used as the pilot symbol signal point, but the pilot symbol signal point is not limited to this and can be any signal point if the signal point has the maximum signal point power of the 64QAM-based signal points.

Figure 14:
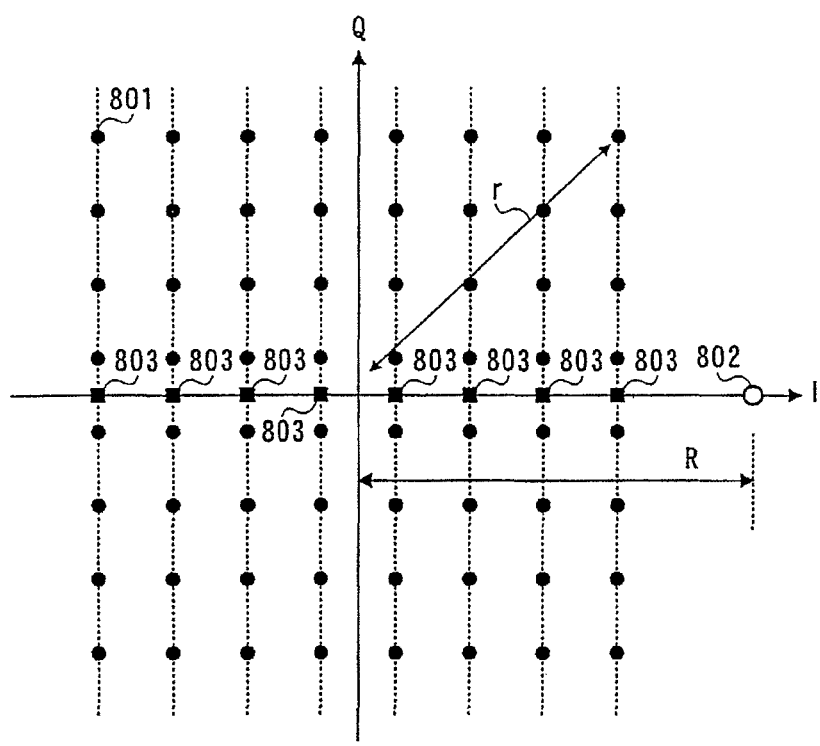
FIG. 14 is a diagram showing a further signal space diagram example according to the 64QAM system in the digital wireless-communication apparatus of the present invention.

FIG. 14 shows a further example of the 64QAM-based signal space diagram on the in-phase I-quadrature Q plane and shows a pilot symbol signal point and signal points of each one symbol immediately before and after of the pilot symbol. In FIG. 14, reference codes 801 indicate 64QAM-based signal points, reference code 802 indicates a pilot symbol signal point, and reference codes 803 indicate signal points of each one symbol immediately before and after the pilot symbol.

Signal points 801 are 64QAM-based signal points on the in-phase I-quadrature Q plane, and if the maximum signal point power of the 64QAM-based signal points is $r^2$ and the signal point power of the pilot symbol is $R^2$, then the relationship between these two is $R^2=r^2$. If the points of intersection of the virtual line or the I axis connecting pilot symbol signal point 802 placed on the I axis and the origin, and the virtual line drawn from 64QAM-based signal point 801 perpendicular to the I axis are designated as signal points of symbol 301 immediately before the pilot symbol and one symbol 302 immediately after the pilot symbol, the pilot symbol transitions on the virtual line connecting the pilot symbol and the origin on the in-phase I-quadrature Q plane even if symbol synchronization is not completely established, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

Furthermore, this configuration has an advantage that it is possible to judge one symbol 301 immediately before the pilot symbol and one symbol 302 immediately after the pilot symbol using a 64QAM-based judgment method.

By the way, $R^2=r^2$ is assumed in FIG. 14, but this limitation is not fixed. Moreover, a pilot symbol signal point to be placed on the I axis can be any signal point other than signal point 802.

As shown above, the digital wireless communication apparatus according to Embodiment 4 places two or more signal points of each one symbol immediately before and after the pilot symbol on a virtual line connecting the origin and pilot symbol signal point on the in-phase-quadrature plane, in the modulation type including the 64QAM system, and in this way can suppress deterioration of the accuracy in estimating the reference phase and the amount of frequency offset by the pilot symbol in quasi-coherent detection of symbols whose symbol synchronization is not completely established, improving the bit error rate characteristic in the signal to noise ratio.

(Embodiment 5)

Figure 15:
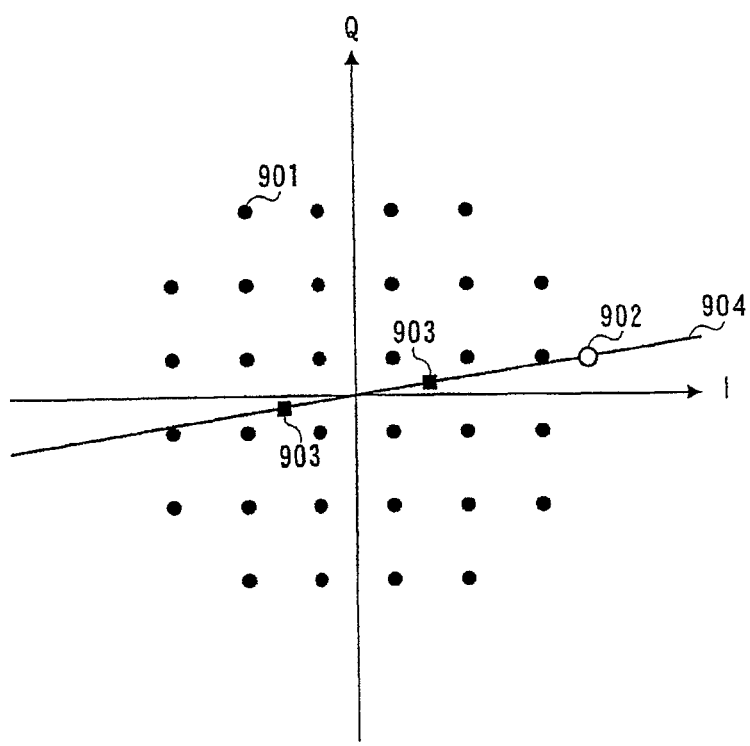
FIG. 15 is a diagram showing a signal space diagram example according to a 32QAM system in the digital wireless communication apparatus of the present invention.

FIG. 15 shows a signal space diagram according to a 32QAM system on the in-phase I-quadrature Q plane and shows a pilot symbol signal point and signal points of each one symbol immediately before and after the pilot symbol.

In FIG. 15, reference codes 901 indicate signal points according to the 32QAM system, reference code 902 indicates a pilot symbol signal point and reference codes 903 indicate signal points of every one symbol immediately before and after the pilot symbol. Reference code 904 is a virtual line connecting the pilot symbol signal point and the origin on the I-Q plane. Two or more signal points 903 of each one symbol immediately before and after the pilot symbol are placed on virtual line 904 connecting pilot symbol signal point 902 and the origin.

Figure 16:
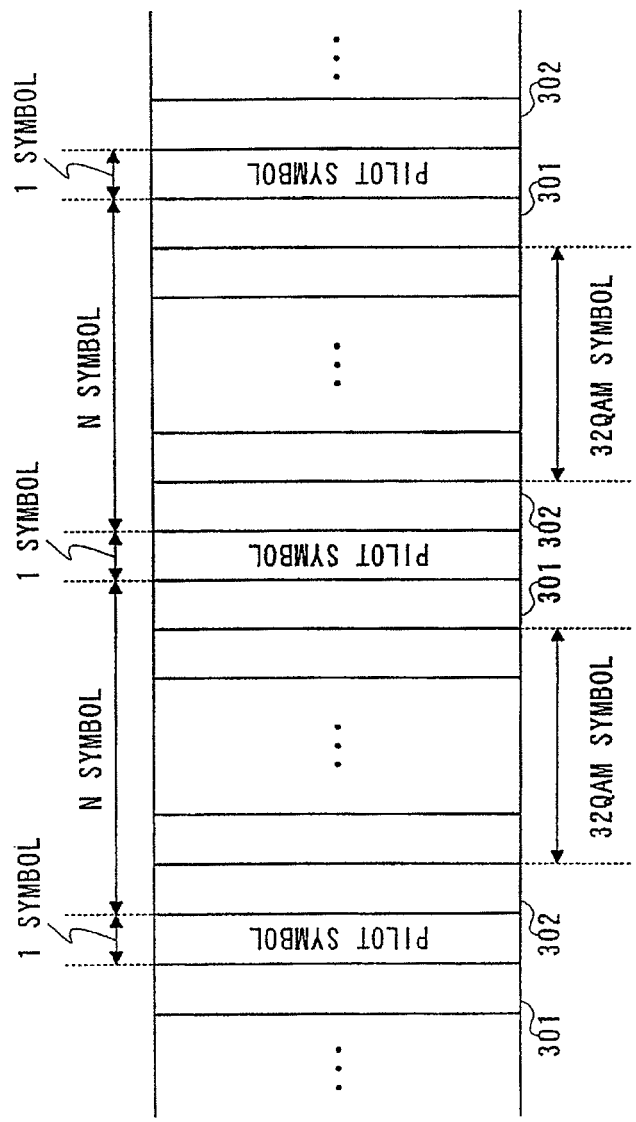
FIG. 16 is a diagram showing a frame configuration example according to the 32QAM system in the digital wireless communication apparatus of the present invention.

FIG. 16 shows a frame configuration example of 32QAM-based symbols and pilot symbols. Reference code 301 indicates one symbol immediately before the pilot symbol and reference code 302 indicates one symbol immediately after the pilot symbol.

At this time, as shown in FIG. 16, two or more signal points of one symbol 301 immediately before the pilot symbol and one symbol 302 immediately after the pilot symbol are placed on virtual line 904 connecting pilot symbol signal point 902 and the origin on the in-phase I-quadrature Q plane.

In Embodiment 5, as in the case of the embodiment above, even if symbol synchronization is not completely established, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

The locations of the pilot symbol signal point and signal points of each one symbol immediately before and after the pilot symbol on the in-phase I-quadrature Q plane are not limited to FIG. 15. Moreover, the frame configuration is not limited to FIG. 16.

As shown above, the digital wireless communication apparatus according to Embodiment 5 places two or more signal points of each one symbol immediately before and after the pilot symbol on a virtual line connecting the origin and pilot symbol signal point on the in-phase-quadrature plane, and in this way can suppress deterioration of the accuracy in estimating the reference phase and the amount of frequency offset by the pilot symbol in quasi-coherent detection of symbols whose symbol synchronization is not completely established, improving the bit error rate characteristic in the signal to noise ratio.

(Embodiment 6)

Figure 17:
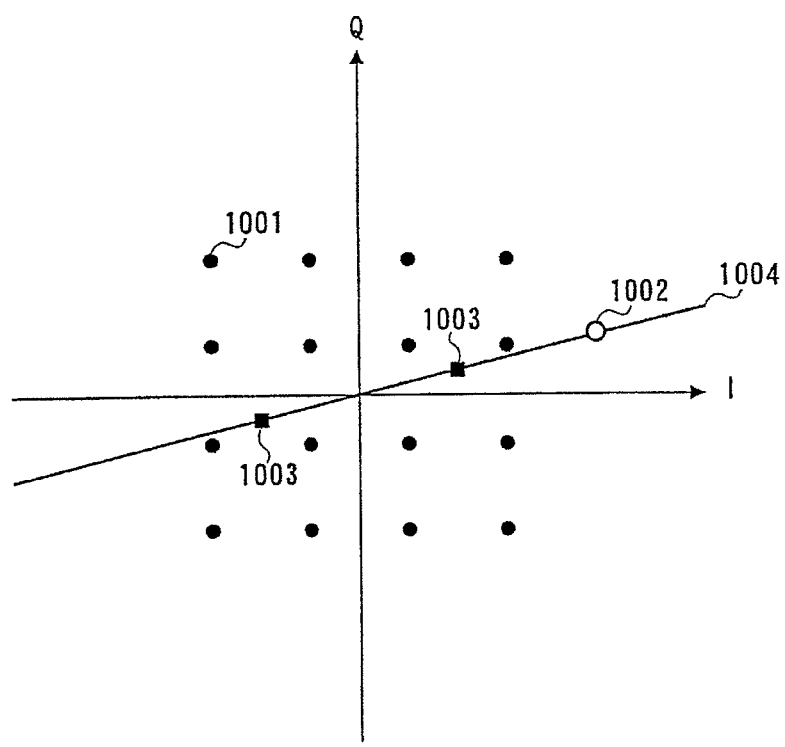
FIG. 17 is a diagram showing a signal space diagram example according to a 16QAM system in the digital wireless communication apparatus of the present invention.

FIG. 17 is a 16QAM-based signal space diagram on the in-phase I-quadrature Q plane and shows a pilot symbol signal point and signal points of each one symbol immediately before and after the pilot symbol. In FIG. 17, reference codes 1001 indicate 64QAM-based signal points, reference code 1002 indicates a pilot symbol signal point and reference codes 1003 indicate signal points of each one symbol immediately before and after the pilot symbol. Reference code 1004 is a virtual line connecting the pilot symbol signal point and the origin on the I-Q plane. Two or more signal points 1003 of each one symbol immediately before and after the pilot symbol are placed on virtual line 1004 connecting pilot symbol signal point 1002 and the origin.

Figure 18:
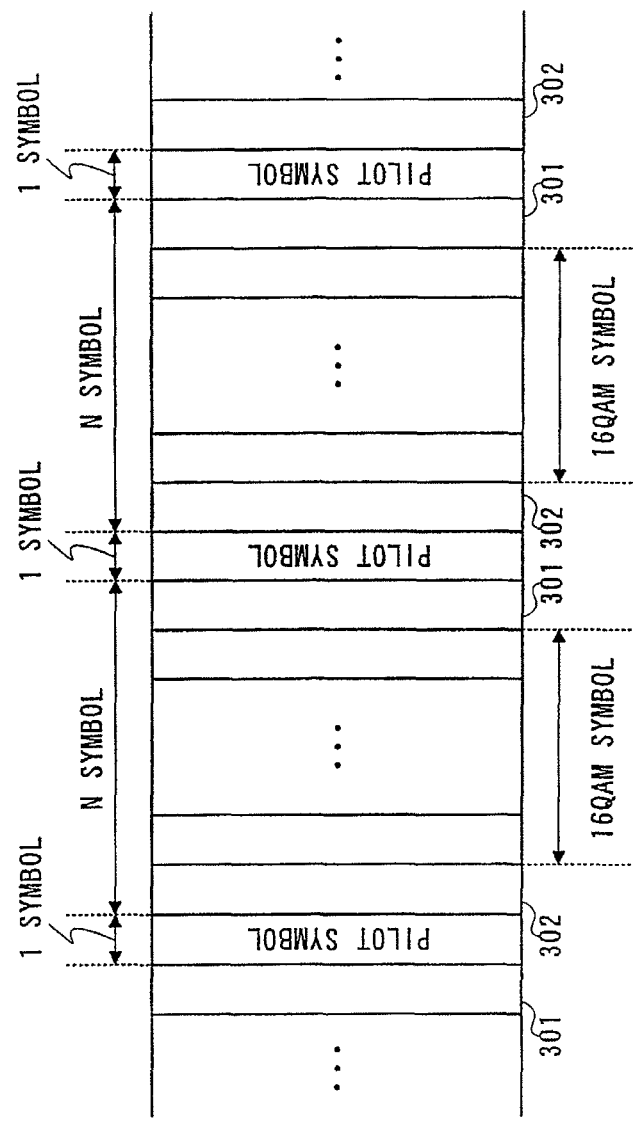
FIG. 18 is a diagram showing a frame configuration example according to the 16QAM system in the digital wireless communication apparatus of the present invention.

FIG. 18 shows a frame configuration example of 64QAM-based symbols and pilot symbol. Reference code 301 indicates one symbol immediately before the pilot symbol and reference code 302 indicates one symbol immediately after the pilot symbol. At this time, two or more signal points of one symbol 301 immediately before the pilot symbol and one symbol 302 immediately after the pilot symbol are placed on virtual line 1004 connecting pilot symbol signal point 1002 and the origin on the in-phase I-quadrature Q plane.

In the digital wireless communication apparatus according to Embodiment 6, as in the case of the embodiment above, even if symbol synchronization is not completely established, the pilot symbol transitions on the virtual line connecting the pilot symbol and the origin on the in-phase I-quadrature Q plane, and therefore it is possible to suppress deterioration of the accuracy in estimating the reference phase and the amount of frequency offset by the pilot symbol. This improves the bit error rate characteristic in the signal to noise ratio during detection of the reception signal.

The locations of the pilot symbol signal point and signal points of each one symbol immediately before and after the pilot symbol on the in-phase I and quadrature Q plane are not limited to FIG. 17. Moreover, the frame configuration is not limited to FIG. 18.

Figure 19:
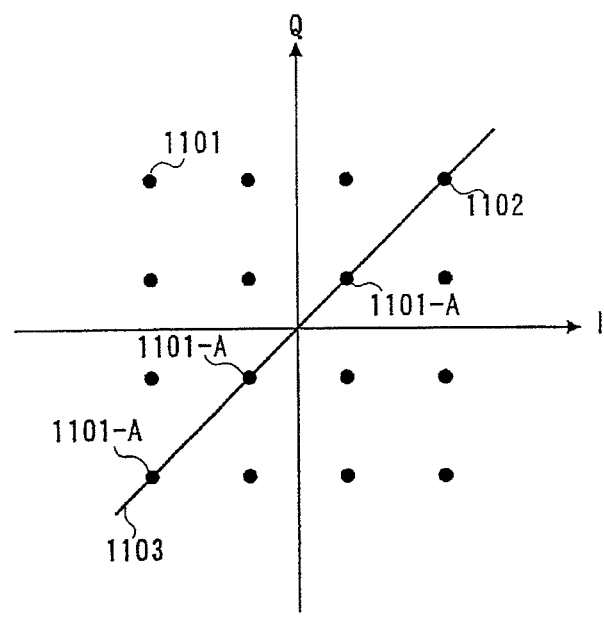
FIG. 19 is a diagram showing another signal space diagram example according to the 16QAM system in the digital wireless communication apparatus of the present invention.

FIG. 19 shows another signal space diagram example of the 16QAM system on the in-phase I-quadrature Q plane and shows a pilot symbol signal point and signal points of each one symbol immediately before and after the pilot symbol. In FIG. 19, reference codes 1101 and 1101-A indicate 16QAM-based signal points, reference codes 1101-A indicate signal points of each one symbol immediately before and after the pilot symbol, reference code 1102 indicates the pilot symbol signal point and reference code 1103 indicates a virtual line connecting the pilot symbol signal point and the origin.

If the signal point with the maximum signal point power of the 16QAM-based signal points is designated as pilot symbol signal point 1102 and signal points 1101-A on virtual line 1103 connecting this and the origin are designated as the signal point of symbol 301 immediately before the pilot symbol and one symbol 302 immediately after the pilot symbol, the pilot symbol transitions on the virtual line connecting the pilot symbol and the origin on the in-phase I-quadrature Q plane even if symbol synchronization is not completely established, and therefore the present embodiment demonstrates the effects shown in FIG. 6B and FIG. 6C and can suppress deterioration of the accuracy in estimating the reference phase and the amount of frequency offset by the pilot symbol. This makes it possible to improve the bit error rate characteristic in the signal to noise ratio during detection of the reception signal.

Moreover, this configuration has an advantage that it is possible to judge one symbol 301 immediately before the pilot symbol and one symbol 302 immediately after the pilot symbol using a 16QAM-based judgment method.

In FIG. 19, signal point 1102 is designated as the pilot symbol signal point, but the pilot symbol signal point is not limited to this and can be any signal point if the signal point has the maximum signal point power of the 16QAM-based signal points.

Figure 20:
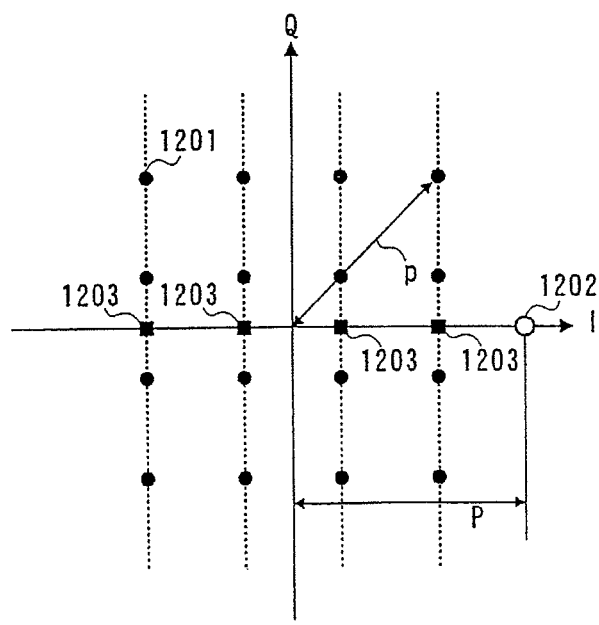
FIG. 20 is a diagram showing a further signal space diagram example according to the 16QAM system in the digital wireless communication apparatus of the present invention.

FIG. 20 shows a further example of the 16QAM-based signal space diagram on the in-phase I-quadrature Q plane and shows a pilot symbol signal point and signal points of each one symbol immediately before and after the pilot symbol. In FIG. 20, reference codes 1201 indicate 16QAM-based signal points, reference code 1202 indicates a pilot symbol signal point, and reference codes 1203 indicate signal points of each one symbol immediately before and after the pilot symbol.

In this case, if the maximum signal point power of the 16QAM-based signal points is $p^2$ and the pilot symbol signal point power is $P^2$, suppose $P^2 = p^2$. If the points of intersection of the virtual line or the I axis connecting pilot symbol signal point 1202 placed on the I axis and the origin, and the virtual line drawn from 16QAM-based signal point 1201 perpendicular to the I axis are designated as signal points of symbol 301 immediately before the pilot symbol and one symbol 302 immediately after the pilot symbol, the pilot symbol transitions on the virtual line connecting the pilot symbol and the origin on the in-phase I-quadrature Q plane even if symbol synchronization is not completely established, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal. Furthermore, this configuration has an advantage that it is possible to judge one symbol 301 immediately before the pilot symbol one symbol 302 immediately after the pilot symbol using a 16QAM-based judgment method.

By the way, $P^2=p^2$ is assumed in FIG. 20, but this limitation is not fixed. Moreover, a pilot symbol signal point to be placed on the I axis can be any signal point other than signal point 1202.

(Embodiment 7)

Figure 21:
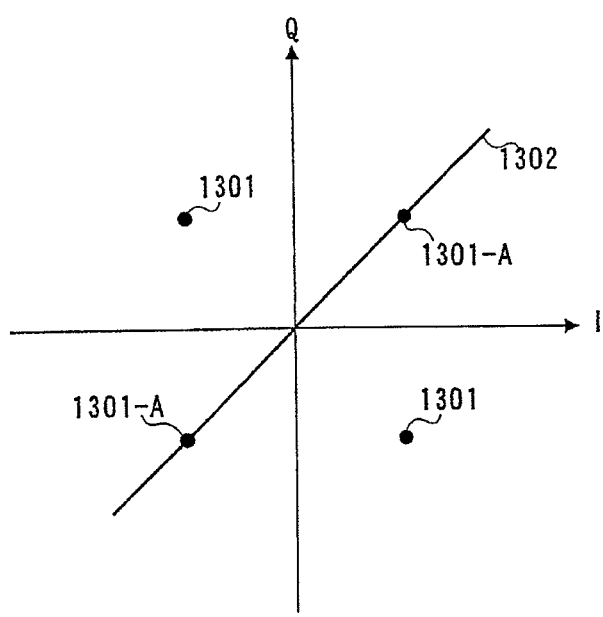
FIG. 21 is a diagram showing a signal space diagram example of a signal point according to a QPSK modulation type, pilot symbol signal point and each one symbol immediately before and after the pilot symbol.

FIG. 21 is a signal space diagram according to a QPSK modulation type on the in-phase I-quadrature Q plane and shows a pilot symbol signal point and signal points of each one symbol immediately before and after the pilot symbol. In FIG. 21, reference codes 1301 and 1301-A indicate signal points according to the QPSK modulation type, reference codes 1301-A indicate signal points of each one symbol immediately before and after the pilot symbol. Reference code 1302 is a virtual line connecting the pilot symbol signal point and the origin.

Figure 22:
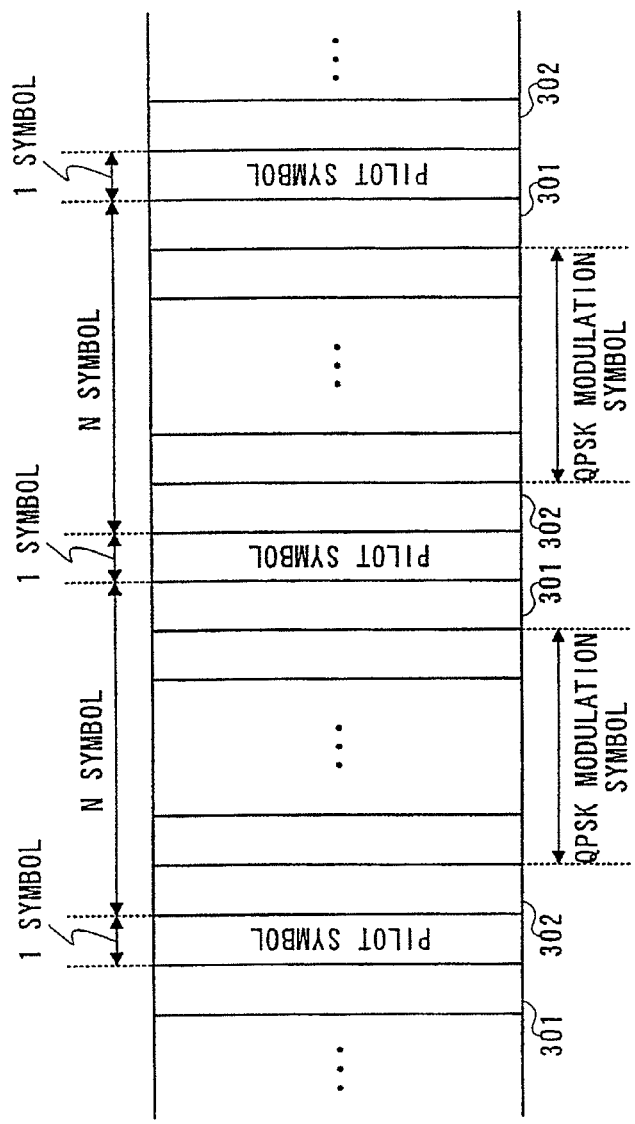
FIG. 22 is a diagram showing a frame configuration example of QPSK modulation symbols and pilot symbols.

FIG. 22 shows a frame configuration example of QPSK modulation symbols and pilot symbols at time t. Reference code 301 indicates one symbol immediately before the pilot symbol and reference code 302 indicates one symbol immediately after the pilot symbol.

FIG. 21 shows the locations of signal points according to the QPSK modulation type on the in-phase I-quadrature Q plane, pilot symbol signal point and signal points 1301-A of each one symbol immediately before and after the pilot symbol. Two signal points 1301-A of each one symbol immediately before and after the pilot symbol are placed on virtual line 1302 connecting pilot symbol signal point 1301-A and the origin.

FIG. 22 shows a frame configuration example of QPSK modulation symbols and pilot symbols at time t. Reference code 301 indicates one symbol immediately before the pilot symbol and reference code 302 indicates one symbol immediately after the pilot symbol.

At this time, two signal points of one symbol 301 immediately before the pilot symbol and one symbol 302 immediately after the pilot symbol are placed on virtual line 1302 connecting pilot symbol signal point 1301-A and the origin on the in-phase I-quadrature Q plane.

In this way, when estimating the reference phase and amount of frequency offset from the pilot symbol, even if symbol synchronization is not completely established, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

The locations of pilot symbol signal point and signal points of each one symbol immediately before and after the pilot symbol on the in-phase I and quadrature Q plane are not limited to FIG. 21. Moreover, the frame configuration is not limited to FIG. 22.

As shown above, the digital wireless communication apparatus according to Embodiment 7 places two signal points of each one symbol immediately before and after the pilot symbol on a virtual line connecting the origin and pilot symbol signal point on the in-phase-quadrature plane, according to the modulation type including the QPSK modulation type in which one pilot symbol is inserted for every 3 or more symbols, and in this way can suppress deterioration of the accuracy in estimating the reference phase and the amount of frequency offset by the pilot symbol in quasi-coherent detection of symbols whose symbol synchronization is not completely established. This improves the bit error rate characteristic in the signal to noise ratio.

(Embodiment 8)

Figure 23:
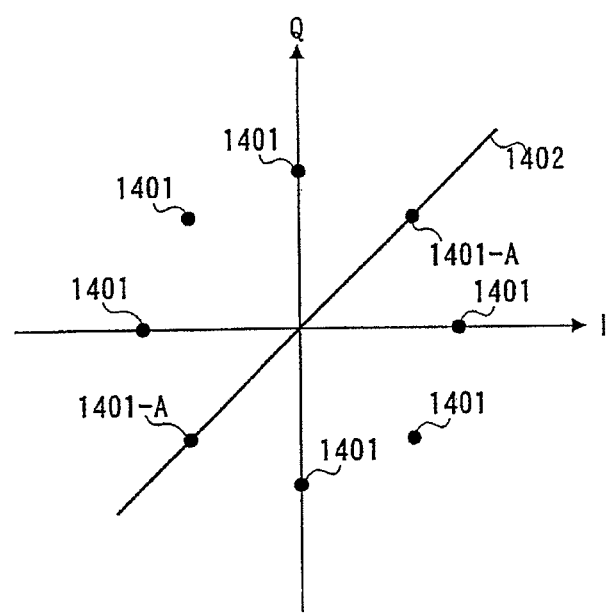
FIG. 23 is a diagram showing a signal space diagram example of π/4-shift DQPSK modulation type signal points, pilot symbol signal points and each one symbol immediately before and after the pilot symbol.

FIG. 23 is a signal space diagram according to a π/4-shift DQPSK (Differential Quadrature Phase Shift Keying) modulation type on the in-phase I-quadrature Q plane and shows a pilot symbol signal point and signal points of each one symbol immediately before and after the pilot symbol. In FIG. 23, reference codes 1401 and 1401-A indicate signal points according to a π/4-shift DQPSK modulation type, and especially reference codes 1401-A indicate signal points of each one symbol immediately before and after the pilot symbol. Reference code 1402 is a virtual line connecting the pilot symbol signal point and the origin.

Figure 24:
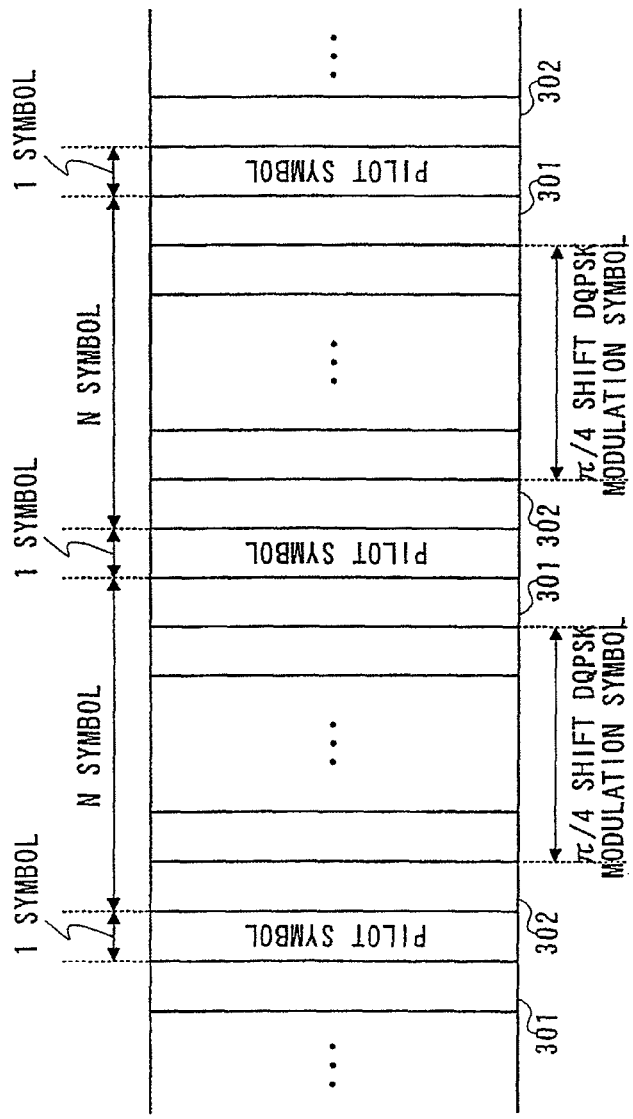
FIG. 24 is a diagram showing a frame-configuration example of π/4-shift DQPSK modulation symbols and pilot symbols.

FIG. 24 shows a frame configuration example of π/4-shift DQPSK modulation symbols and pilot symbols. Reference code 301 indicates one symbol immediately before the pilot symbol and reference code 302 indicates one symbol immediately after the pilot symbol.

FIG. 23 shows the locations of signal points 1401 and 1401-A according to the π/4-shift DQPSK modulation type on the in-phase I-quadrature Q plane, pilot symbol signal point 1401-A and signal points 1401-A of each one symbol immediately before and after the pilot symbol. Two signal points 1401-A of each one symbol immediately before and after the pilot symbol are placed on virtual line 1402 connecting pilot symbol signal point 1401-A and the origin.

FIG. 24 shows a frame configuration example of π/4-shift DQPSK modulation symbols and pilot symbols. Reference code 301 indicates one symbol immediately before the pilot symbol and reference code 302 indicates one symbol immediately after the pilot symbol.

At this time, two signal points of one symbol 301 immediately before the pilot symbol and one symbol 302 immediately after the pilot symbol are placed on virtual line 1402 connecting pilot symbol signal point 1401-A and the origin on the in-phase I-quadrature Q plane.

In this way, when estimating the reference phase and the amount of frequency offset from the pilot symbol, even if symbol synchronization is not completely established, the pilot symbol transitions on the virtual line connecting the pilot symbol and the origin on the in-phase I-quadrature Q plane, and therefore the present embodiment demonstrates the effects shown in FIG. 6B and FIG. 6C, making it possible to suppress deterioration of the accuracy in estimating the reference phase and the amount of frequency offset by the pilot symbol. This improves the bit error rate characteristic in the signal to noise ratio during detection of the reception signal.

The locations of pilot symbol signal point and signal points of each one symbol immediately before and after the pilot symbol on the in-phase I and quadrature Q plane are not limited to FIG. 23. Moreover, the frame configuration is not limited to FIG. 24.

As shown above, the digital wireless communication apparatus according to Embodiment 8 places two signal points of each one symbol immediately before and after the pilot symbol on a virtual line connecting the origin and pilot symbol signal point on the in-phase-quadrature plane, according to the π/4-shift DQPSK modulation type in which one pilot symbol is inserted for every 3 or more symbols, and in this way can suppress deterioration of the accuracy in estimating the reference phase and the amount of frequency offset by the pilot symbol in quasi-coherent detection of symbols whose symbol synchronization is not completely established. This improves the bit error rate characteristic in the signal to noise ratio.

(Embodiment 9)

In a wireless communication apparatus, one of functions consuming a large amount of power is a power amplifier. FIG. 25 shows a trail of the I component and Q component of a 16QAM quadrature baseband signal on the I-Q plane. At this time, suppose the in-phase signal is I and the quadrature signal is Q, then the available power amplifier is determined by the maximum value of $I^2+Q^2$, max $(I^2+Q^2)$, and average value, ave($I^2+Q^2$).

Figure 26:
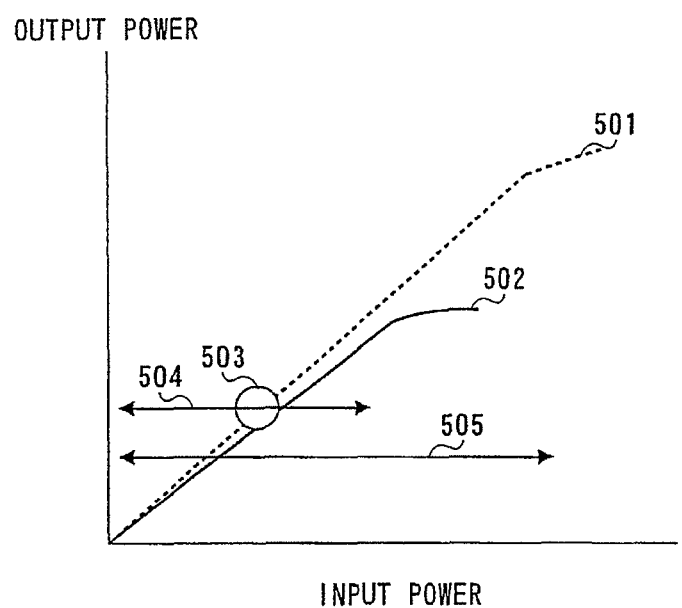
FIG. 26 is a diagram showing a relationship between the input power and output power of an amplifier in the digital wireless communication apparatus.

FIG. 26 is a diagram showing an input/output characteristic of the power amplifier. In FIG. 26, reference code 1501 indicates a characteristic curve of a power amplifier with large output power, reference code 1502 indicates a characteristic curve of a power amplifier with small output power, reference code 1503 indicates average output power, reference code 1504 indicates a modulation type with small variation of $I^2+Q^2$ and reference code 1505 indicates a modulation type with large variation of $I^2+Q^2$.

At this time, when the average output power is indicated by reference code 1503, amplification is possible using the power amplifier with the characteristic of reference code 1502 according to the modulation type of reference code 1504, whereas amplification is not possible using the power amplifier with the characteristic of reference code 1502 according to the modulation type of reference code 1505. Therefore, the power amplifier with the characteristic of reference code 1501 should be used.

At this time, the power amplifier with the characteristic of reference code 1501 has larger power consumption than the power amplifier with the characteristic of reference code 1502. In this way, the modulation type with a smaller maximum value of $I^2+Q^2$, max $(I^2+Q^2)$, can use the power amplifier with smaller power consumption. When focused on the location of the pilot symbol signal point on the I-Q plane, the greater the distance from the origin, the stronger noise resistance of the pilot symbol the receiver side has, thus improving the bit error rate.

However, when focused on the power amplifier in the transmitter, it is not desirable that the maximum value of $I^2+Q^2$, max $(I^2+Q^2)$, be increased by increasing the pilot symbol.

Thus, the present embodiment increases the distance of the pilot symbol from the origin without increasing the maximum value of $I^2+Q^2$, max $(I^2+Q^2)$, on the I-Q plane. This makes it possible to improve the bit error rate in the receiver without increasing power consumption of the power amplifier of the transmitter.

Then, the method of improving the bit error rate in the receiver without increasing power consumption of the power amplifier of the transmitter in the present embodiment is explained taking as an example the case where a 16QAM system is used as the modulation type. In FIG. 25, the maximum value of $I^2+Q^2$, max $(I^2+Q^2)$, according to the 16QAM system comes to the position indicated by reference code 1601 on its way from signal point A to signal point A.

According to FIG. 17 and FIG. 18, from the relationship between the pilot symbol signal point, signal points 301 and 302 of each one symbol immediately before and after the pilot symbol, even if the distance of the pilot symbol signal point from the origin on the I-Q plane is increased more than the maximum amplitude at signal points in the 16QAM system as shown in FIG. 25, it is possible to keep that distance smaller than the maximum value of $I^2+Q^2$, max $(I^2+Q^2)$, in the 16QAM system. This makes it possible to improve the bit error rate in the receiver without increasing power consumption of the power amplifier of the transmitter, by increasing the amplitude at the pilot symbol signal point on the I-Q plane more than the maximum amplitude at signal points in the 16QAM system.

Suppose the amplitude at the pilot symbol signal point is greater than the maximum amplitude at multivalue modulation signal points on the I-Q plane. Furthermore, since the amplitude at the pilot signal symbol point is increased, it is possible to improve the accuracy in estimating the amount of amplitude distortion and the amount of frequency offset on the receiving side. As a result, it is possible to improve the bit error rate characteristic.

Then, the effects of the present embodiment are explained in detail with reference to FIG. 9 and FIG. 10.

As shown in FIG. 9, the multivalue QAM signal space diagram on the in-phase I-quadrature Q plane is given in Equation 1 below:

$$I_{QAM}=r(2^{m-1}a_1+2^{m-2}a_2+\ldots+2^0a_m)$$

$$Q_{QAM}=r(2^{m-1}b_1+2^{m-2}b_2+\ldots+2^0b_m) \quad (1)$$

where suppose signal points according to the multivalue QAM system are expressed as (IQAM, QQAM), m is an integer, (a1, b1), (a2, b2), ..., (am, bm) are binary codes of 1, −1, and r is a constant.

Two or more signal points 503 of each one symbol immediately before and after the pilot symbol are placed on virtual line 504 connecting pilot symbol signal point 502 and the origin. As shown in FIG. 10, two or more signal points of one symbol 301 immediately before the pilot symbol and one symbol 302 immediately after the pilot symbol on virtual line 504 connecting pilot symbol signal point 502 and the origin on the in-phase I-quadrature Q plane. In this way, even if symbol synchronization is not completely established, the pilot symbol transitions on a straight line connecting the pilot symbol and the origin on the in-phase I-quadrature Q plane, and therefore it is possible to suppress deterioration of the accuracy in estimating the reference phase and the amount of frequency offset by the pilot symbol. This improves the bit error rate characteristic in the signal to noise ratio during detection of the reception signal.

Furthermore, if a maximum value of the multivalue QAM signal point power on the in-phase I-quadrature Q plane is a and the pilot symbol signal point power on the in-phase I-quadrature Q plane is b, maintaining b>a makes it possible to improve the accuracy in estimating amplitude distortion by the amplitude distortion estimating section and the accuracy in estimating the amount of frequency offset by the frequency offset amount estimating section on the receiving side without deteriorating the power efficiency of the power amplifier on the transmitting side as described above. This improves the bit error rate characteristic in the signal to noise ratio during detection of the reception signal.

By the way, the locations of the pilot symbol signal point and signal points of each one symbol immediately before and after the pilot symbol on the in-phase I-quadrature Q plane are not limited to FIG. 9, but greater effects are obtained especially when the pilot symbol signal point is placed on the axis. The frame configuration is not limited to FIG. 10.

Furthermore, if the frequency character of the route roll-off filter, which is a band limiting filter, is as shown in Equation 2 below, changing the roll-off factor from 0.1 to 0.4 and setting the signal point amplitude of the pilot symbol to a value greater than 1.0 time and smaller than 1.6 times the maximum signal point amplitude according to the multivalue QAM system can improve the accuracy in estimating the amount of frequency offset and the amount of amplitude distortion when carrying out quasi-coherent detection. This results in a greater effect of improving the bit error rate characteristic in the signal to noise ratio. In Equation 2, $\omega$ is frequency in radian, $\alpha$ is roll-off factor, $\omega 0$ is Nyquist frequency in radian and $H(\omega)$ is amplitude characteristic of the route roll-off filter.

$$H(\omega) = \begin{cases} 1 & \omega \leq \omega_0(1-\alpha) \\ \sqrt{\frac{1}{2}\left[1 - \sin\left\{\frac{\pi}{2\alpha\omega_0}(\omega - \omega_0)\right\}\right]} & \omega_0(1-\alpha) \leq \omega \leq \omega_0(1+\alpha) \\ 0 & \omega \geq \omega_0(1+\alpha) \end{cases} \quad (2)$$

The present embodiment explains the multivalue QAM system as an example of a multivalue modulation type with 8 or more values, but the multivalue modulation type with 8 or more values is not limited to this. Moreover, a 64QAM system, 32QAM system, 16QAM system, 8PSK modulation type and QPSK modulation type can also produce effects similar to those of the multivalue QAM system.

As shown above, the digital wireless communication apparatus according to Embodiment 9 places two or more signal points of each one symbol immediately before and after the pilot symbol on a virtual line connecting the origin and pilot symbol signal point on the in-phase-quadrature plane, in the multivalue modulation type with 8 or more values in which one pilot symbol is inserted for every 3 or more symbols and increases the amplitude at the pilot symbol signal point more than the maximum amplitude at signal points according to the multivalue modulation type with 8 or more values. In this way, it is possible to suppress deterioration of the accuracy in estimating the reference phase and the amount of frequency offset by the pilot symbol in quasi-coherent detection of symbols whose symbol synchronization is not completely established, improve the bit error rate characteristic in the signal to noise ratio and further improve the bit error rate characteristic in the signal to noise ratio without deteriorating the power efficiency of the power amplifier on the transmitting side.

As shown above, the present invention differentiates the modulation type immediately before and after the pilot symbol from the modulation type of the pilot symbol, and therefore can suppress deterioration of the accuracy in estimating the reference phase and the amount of frequency offset by the pilot symbol in quasi-coherent detection of symbols whose symbol synchronization is not completely established, improve the bit error rate characteristic in the signal to noise ratio. The present invention can further improve the bit error rate characteristic in the signal to noise ratio without deteriorating the power efficiency of the power amplifier on the transmitting side, by increasing the amplitude at the pilot symbol signal point more than the maximum amplitude at signal points according to the multivalue modulation type.

The present invention is not limited to Embodiments 1 to 9, but can also be implemented with various modifications. Moreover, Embodiments 1 to 9 can be implemented in a variety of combinations thereof as appropriate.

The present invention is not limited to the above described embodiments, and various variations and modifications may be possible without departing from the scope of the present invention.

This application is based on the Japanese Patent Application No. HEI 11-010146 filed on Jan. 19, 1999 and the Japanese Patent Application No. HEI 11-213264 filed on Jul. 28, 1999, entire content of which is expressly incorporated by reference herein.

The invention claimed is:

1. A wireless communications apparatus comprising:
   a transmitter comprising
      a first modulator configured to modulate a first pilot symbol according to a first modulation scheme,
      a second modulator configured to modulate specific first symbols according to a second modulation scheme different from the first modulation scheme, and
      a timing controller cooperating with said first and second modulators so that modulated specific first symbols are inserted before and after associated modulated first pilot symbols; and
   a receiver configured to generate a reception baseband signal based upon modulated second pilot symbols with modulated specific second symbols inserted before and after associated modulated second pilot symbols.

2. The wireless communications apparatus according to claim 1 wherein said timing controller is configured so that the modulated specific first symbols are inserted immediately before and after the associated modulated first pilot symbols.

3. The wireless communications apparatus according to claim 1 wherein said receiver is configured to generate the reception baseband signal based upon modulated second pilot symbols with modulated specific second symbols inserted immediately before and after the associated modulated second pilot symbols.

4. The wireless communications apparatus according to claim 1 wherein said first and second modulation schemes each comprises a multivalue modulation scheme.

5. The wireless communications apparatus according to claim 4 wherein the second modulation scheme has fewer multivalues than the first modulation scheme.

6. The wireless communications apparatus according to claim 1 wherein the first and second modulation schemes are selected from a group of a 64QAM modulation scheme, a 32QAM modulation scheme, a 16QAM modulation scheme, a 8PSK modulation scheme, a QPSK modulation scheme, a 16APSK modulation scheme, and a π/4-shift DQPSK modulation scheme.

7. The wireless communications apparatus according to claim 1 wherein the second modulation scheme places at least two signal points on a virtual line connecting an origin and a first pilot symbol signal point in a signal space diagram.

8. The wireless communications apparatus according to claim 7 wherein the first pilot symbol signal point has an amplitude greater than a maximum amplitude at signal points modulated according to the first modulation scheme in the signal space diagram.

9. The wireless communications apparatus according to claim 1 wherein said receiver comprises:
   a receiver section configured to generate the reception baseband signal;
   an amplitude distortion estimator configured to generate an amplitude estimation signal based upon the reception baseband signal; and
   a frequency distortion estimator configured to generate a frequency estimation signal based upon the reception baseband signal.

10. The wireless communications apparatus according to claim 9 wherein said receiver further comprises:
    a frame timing signal generator configured to generate a frame timing signal based on the reception baseband signal; and
    a first demodulator configured to demodulate a first symbol included in the reception baseband signal based on the frame timing signal, the amplitude estimation signal and the frequency estimation signal.

11. The wireless communications apparatus according to claim 10 wherein said receiver further comprises a second demodulator configured to demodulate the modulated second specific symbols based on the frame timing signal, the amplitude estimation signal and the frequency estimation signal.

12. A wireless communications apparatus comprising:
    a transmitter comprising
       a first modulator configured to modulate a first pilot symbol according to a first modulation scheme,
       a second modulator configured to modulate specific first symbols according to a second modulation scheme different from the first modulation scheme, and
       a timing controller cooperating with said first and second modulators so that modulated specific first symbols are inserted before and after associated modulated first pilot symbols; and
    a receiver configured to generate a reception baseband signal from a received modulated signal based upon modulated second pilot symbols with modulated specific second symbols inserted before and after associated modulated second pilot symbols.

13. The wireless communications apparatus according to claim 12 wherein said timing controller is configured so that the modulated specific first symbols are inserted immediately before and after the associated modulated first pilot symbols.

14. The wireless communications apparatus according to claim 12 wherein said receiver is configured to generate the reception baseband signal from the received modulated signal based upon modulated second pilot symbols with modulated specific second symbols inserted immediately before and after the associated modulated second pilot symbols.

15. The wireless communications apparatus according to claim 12 wherein said first and second modulation schemes each comprises a multivalue modulation scheme.

16. The wireless communications apparatus according to claim 15 wherein the second modulation scheme has fewer multivalues than the first modulation scheme.

17. The wireless communications apparatus according to claim 12 wherein the first and second modulation schemes are selected from a group of a 64QAM modulation scheme, a 32QAM modulation scheme, a 16QAM modulation scheme, a 8PSK modulation scheme, a QPSK modulation scheme, a 16APSK modulation scheme, and a π/4-shift DQPSK modulation scheme.

18. The wireless communications apparatus according to claim 12 wherein the second modulation scheme places at least two signal points on a virtual line connecting an origin and a first pilot symbol signal point in a signal space diagram.

19. The wireless communications apparatus according to claim 18 wherein the first pilot symbol signal point has an amplitude greater than a maximum amplitude at signal points modulated according to the first modulation scheme in the signal space diagram.

20. The wireless communications apparatus according to claim 12 wherein said receiver comprises:
    a receiver section configured to generate the reception baseband signal;
    an amplitude distortion estimator configured to generate an amplitude estimation signal based upon the reception baseband signal; and
    a frequency distortion estimator configured to generate a frequency estimation signal based upon the reception baseband signal.

21. The wireless communications apparatus according to claim 20 wherein said receiver further comprises:
    a frame timing signal generator configured to generate a frame timing signal based on the reception baseband signal; and
    a first demodulator configured to demodulate a first symbol included in the reception baseband signal based on the frame timing signal, the amplitude estimation signal and the frequency estimation signal.

22. The wireless communications apparatus according to claim 21 wherein said receiver further comprises a second demodulator configured to demodulate the modulated second specific symbols based on the frame timing signal, the amplitude estimation signal and the frequency estimation signal.

23. A method for operating a wireless communications apparatus comprising:
    modulating at a transmitter a first pilot symbol according to a first modulation scheme;
    modulating at the transmitter specific first symbols according to a second modulation scheme different from the first modulation scheme so that modulated specific first symbols are inserted before and after associated modulated first pilot symbols; and
    generating at a receiver a reception baseband signal based upon modulated second pilot symbols with modulated specific second symbols inserted before and after associated modulated second pilot symbols.

24. The method to claim 23 wherein modulating at the transmitter comprises modulating at the transmitter so that the modulated specific first symbols are inserted immediately before and after the associated modulated first pilot symbols.

25. The method to claim 23 wherein generating at the receiver comprises generating at the receiver the reception baseband signal from the received modulated signal based upon second modulated pilot symbols with modulated specific second symbols inserted immediately before and after the associated modulated second pilot symbols.

* * * * *